US012756789B2

(12) United States Patent
Ni

(10) Patent No.: US 12,756,789 B2
(45) Date of Patent: Oct. 6, 2026

(54) COLOR CORRECTION MATRIX CALIBRATION FOR HIGH DYNAMIC RANGE SENSORS

(71) Applicant: NVIDIA Corporation, Santa Clara, CA (US)

(72) Inventor: Yongshen Ni, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 306 days.

(21) Appl. No.: 18/419,351

(22) Filed: Jan. 22, 2024

(65) Prior Publication Data

US 2025/0240381 A1 Jul. 24, 2025

(51) Int. Cl.

| | |
|---|---|
| ***H04N 1/60*** | (2006.01) |
| ***G06T 9/00*** | (2006.01) |
| ***G06V 10/56*** | (2022.01) |
| ***G06V 10/60*** | (2022.01) |

(52) U.S. Cl.
CPC ................. *H04N 1/60* (2013.01); *G06T 9/00* (2013.01); *G06V 10/56* (2022.01); *G06V 10/60* (2022.01)

(58) Field of Classification Search
CPC . H04N 1/60; G06T 9/00; G06V 10/56; G06V 10/60
See application file for complete search history.

(56) References Cited

U.S. PATENT DOCUMENTS

| | | | | |
|---|---|---|---|---|
| 10,430,457 B2 * | 10/2019 | Honjo | G06F 16/5838 | |
| 2009/0147098 A1 * | 6/2009 | Li | H04N 23/85 | 348/E11.001 |
| 2012/0081385 A1 * | 4/2012 | Cote | G06V 40/162 | 345/589 |
| 2015/0296193 A1 * | 10/2015 | Cote | G06T 3/4015 | 382/167 |
| 2018/0048801 A1 * | 2/2018 | Kiser | G06T 1/20 | |
| 2018/0270489 A1 * | 9/2018 | Maymon | G06T 5/92 | |
| 2022/0116584 A1 * | 4/2022 | St. John | G06T 7/90 | |
| 2022/0164596 A1 * | 5/2022 | Chun | G06N 3/08 | |
| 2022/0256071 A1 * | 8/2022 | Mcelvain | H04N 23/741 | |
| 2022/0270220 A1 * | 8/2022 | Kagawa | G06V 40/162 | |

* cited by examiner

*Primary Examiner* — Amandeep Saini
*Assistant Examiner* — Andrew S Budisalich
(74) *Attorney, Agent, or Firm* — Lowenstein Sandler LLP

(57) ABSTRACT

Apparatuses, systems, and techniques to receive, at a processor associated with an image signal processing (ISP) pipeline, a target image captured using a sensor at a first bit-depth associated with the sensor, where the ISP pipeline is associated with a second bit-depth; apply one or more dynamic range compression operations to brightness values associated with the target image to obtain compressed brightness values; determine brightness gain values using the brightness values and the compressed brightness values; apply the brightness gain values to each color channel of respective pixels of the target image to obtain a compressed target image such that a color ratio of the compressed target image is preserved; and adjust a color correction matrix (CCM) associated with the ISP pipeline using the compressed target image.

20 Claims, 13 Drawing Sheets

300

COLOR CORRECTION MATRIX CALIBRATION FOR HIGH DYNAMIC RANGE SENSORS

TECHNICAL FIELD

Embodiments disclosed herein pertain to compression of images, including compression of images within an image signal processing (ISP) pipeline. For example, at least one embodiment pertains to processors or computing systems used to compress an image according to a power curve and calibrate a color correction matrix (CCM) for a high dynamic range sensor.

BACKGROUND

High dynamic range (HDR) image sensors capture data with a large dynamic range often exceeding the memory, hardware and data bandwidth available to process them. Accordingly, raw image data captured using image sensors is commonly compressed to reduce the bandwidth requirements to match an ISP pipeline. Modern image sensors (e.g., automotive or robotics sensors) are often HDR image sensors that support high bit-depths of images in order to provide a large dynamic illumination range when capturing images, for example at 24-bit resolution. The ISP hardware, on the other hand, may not be capable of supporting such a high bit depth, resulting in potential color inaccuracies at the ISP pipeline due to the difference in bit depth resolution between the sensor and the ISP pipeline.

DETAILED DESCRIPTION

Figure 1:
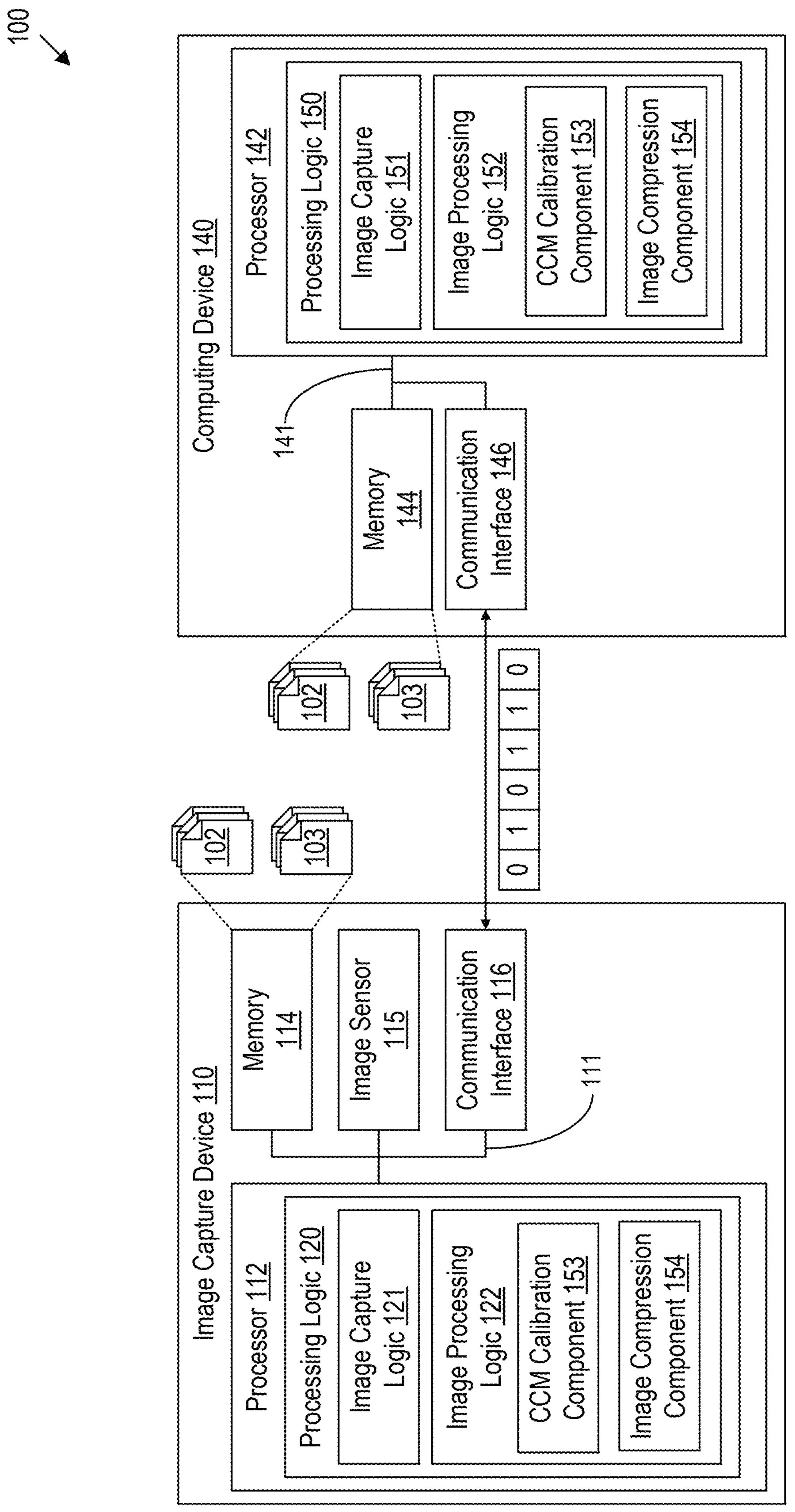
FIG. 1 illustrates a computer system for hosting and executing an example color correction matrix (CCM) calibration component, in accordance with at least one embodiment of the present disclosure.

High Dynamic Range (HDR) imaging has become a critical aspect of digital photography, video capture, and computer vision applications. HDR image sensors are designed to capture a wider range of luminance values in a single image when compared to traditional systems. HDR imaging can accurately represent details in both bright and dark areas of a scene, ever when significant contrast is present in the lighting of the scene. The output dynamic range of HDR sensors with modern technology can reach more than 140 decibels (dB) and, therefore, HDR sensors are widely adopted by automotive driving assist systems (ADAS) as HDR sensors excel in capturing details in varied lighting conditions and can improve object detection systems.

A challenging issue emerging in supporting HDR sensor technology is due to HDR sensors using an increased number of bits to represent pixels compared to low dynamic range (LDR) sensors and standard dynamic range (SDR) sensors. A compression scheme can be used to process data generated at an initial high bit depth from a camera sensor, such that the data can be compressed at an image signal processing (ISP) pipeline to a lower bit depth associated with the ISP pipeline as compared to the initial high bit depth that is associated with the HDR sensor. For example, an HDR sensor may produce an image with a high bit depth, such as 24 bits per color channel per pixel. The image can be compressed to a lower, ISP hardware bit depth, such as 20 bits per color channel. However, when raw data is compressed, color information may be distorted during the compression process. For example, a dynamic range compression (DRC) algorithm may be applied to each color channel of a pixel. However, the amount of light reaching the HDR sensor, and the recorded sensor output may deviate from a linear relationship. Accordingly, a nonlinear DRC algorithm (referred to herein as a nonlinear compression curve) may be used to compress raw image data. In some instances, a mathematical transformation referred to as a Color Correction Matrix (CCM) may be applied to the output of the non-linear DRC algorithm to transform compressed HDR data to a standard color space (e.g., standard red, green, blue (sRGB) for display on an output device (e.g., an LDR display device) and correct color inaccuracies introduced by the sensor and/or during compression. However, conventional color correction approaches may assume a linear model that maps red, green, blue (RGB) data to a standard color space (e.g., sRGB) with a CCM. Such an approach may fail to account for distortion introduced by a non-linear DRC algorithm and exacerbate the issue by introducing additional color distortion as it fails to account for a nonlinear compression curve associated with an ISP pipeline.

In some instances, conventional systems may account for a nonlinear compression curve and color distortion by utilizing a piecewise linear approach with multiple linear response segments. The sensor compression can be performed using a piecewise linear (PWL) function that can be implemented according to a compression curve using curve fitting techniques. The compression power curve may be selected to compress an HDR image from the sensor bit-depth (e.g., 24 bits) to the image signal processing (ISP) bit-depth (e.g., 20 bits), where a level of compression of a certain region of the image is based on a pixel value of the region according to the compression power curve. For example, an HDR sensor may have five response segments to achieve 140 dB or more. The first segment may correspond to dark areas or shadows and cover a first portion of the compression power curve, the second segment may correspond to a transition zone between shadows and midtones and cover a second portion of the compression curve, the third segment may correspond to midtones and cover a third portion of the compression curve, the fourth segment may correspond to a transition between midtones and highlights and cover a fourth portion of the compression curve, and a fifth segment may correspond to highlights or bright areas and cover a fifth portion of the compression curve.

Color correction may be performed for each individual segment such that compression gain disparity is not significant in each segment and linearity is roughly preserved for color correction matrix (CCM) optimization. However, hardware may be modified to support multiple segments. Accordingly, the capability to support a piecewise linear response with multiple segments may be constrained by hardware and associated signal processing capabilities. For example, each segment may include a dedicated response function or calibration, and hardware may be designed to accommodate variations between response functions. Additionally, a processing unit (e.g., integrated into the sensor or as part of a larger computing system) may handle computing associated with multiple response segments such as calibration, mapping, and adaptive adjustments based on scene characteristics. Accordingly, such systems typically utilize additional hardware to support multiple segments and consume processing resources associated with multiple response segments, thereby increasing an overall latency of the system.

Aspects of the present disclosure address the above and other deficiencies by providing a mechanism that adjusts a CCM by compressing pixel brightness (referred to as "Luminance" herein) while preserving pixel color ratio to obtain a target RGB for CCM adjustment/calibration. Target RGB can refer to a specific set of color values in the red, green, and blue color channel that are considered to be the intended output colors for an image or a display. As result, when dynamic range compression and color correction are performed, the target RGB is as close to the color channels of the input HDR raw sensor data as possible within a compressed dynamic range.

In some embodiments, target RGB values can be computed using a calibration target, such as a color chart with known RGB values that cover a range of colors and tones. The HDR sensor may capture an image of the calibration target and use the target image for CCM calibration. In some embodiments, the system can compute luminance gain associated with each pixel of the target image based on a compression curve associated with the HDR sensor. The compression curve may be based on a target compression ratio (e.g., ratio of input bit-depth to output bit-depth). As an example, the pixel value of the region of the target image may include a brightness (e.g., luminance) value of the region of the image. In some embodiments, luminance values, measured in lux, represent an amount of light coming from each surface in a scene within the image, and luminance gain is a factor or multiplier applied to the luminance of the data using the compression curve. For example, the luminance gain can be computed using the following equation, where $L^{\alpha}$ is the luminance value after applying the power curve to the target sensor data and L is the Luminance value before applying the compression curve:

$$\text{gain} = L^{\alpha}/L$$

In some embodiments, the Luminance gain can then be applied to each color channel of the corresponding pixel of the target image such that color ratios associated with each color channel are maintained as if the compression power curve was not applied to the color channels. In some embodiments, the target image data is compressed by compressing the luminance values according to the compression power curve and compressing color components according to luminance gain values. The compressed target image can be analyzed to determine the difference between actual colors (as known from the target image) and colors captured by the image sensor and compressed according to the ISP pipeline. CCM coefficients can be calculated based on the differences between the color values of compressed target image and the actual, known color values of the target image.

In some embodiments, color components of subsequent input images can be mapped to a standard color space by the adjusted CCM. The color components mapped by the calibrated CCM may align with the target image such that colors ratios, hue of the colors, and saturation of the colors are preserved while dynamic range brightness is compressed to match ISP bit-depth. This can improve color accuracy when compressing HDR signals. Moreover, the introduced technique can avoid unnecessary hardware and consumption of resources associated with using a piecewise linear approach with multiple linear response segments. Existing solutions fail to decompose a target image into brightness components and color components for target data compression and CCM optimization.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. The systems and methods described herein may be used by other systems that use image sensors, such as security cameras, webcams, digital cameras, robots, and so on. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be included in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing one or more digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, systems implementing one or more large language models (LLMs), systems for performing generative AI operations, and/or other types of systems.

FIG. 1 illustrates an imaging system 100 in accordance with at least one embodiment of the present disclosure. Imaging system 100 may represent any system that can be used to capture and process digital images (e.g., still images, multiple simultaneously captured images, videos comprising a sequence of image frames, etc.). Imaging system 100 may take a variety of forms, including for example, a digital camera, an automotive, aerial, or robotic vision system, a medical imaging system, a security or surveillance system, a personal computer or laptop, or other system that may capture and process digital images.

In some embodiments, imaging system 100 may include an image capture device 110 and a computing device 140. The image capture device 110 may be used to capture one or more images (e.g., of a physical scene illuminated by one or more illuminants), which in turn, may be provided to the computing device 140 for further processing. In some embodiments, the image capture device 110 may perform some initial processing (or pre-processing) of the captured images before providing them to computing device 140. The computing device 140 may receive captured images from image capture device 110 and process them further. In some embodiments, for example, the computing device 140 compress image data, such as Bayer CFA image data, received from image capture device 110 according to one or more techniques described herein.

Image capture device 110 may take a variety of forms, including for example, a digital camera, a video camera, or a camera or sensor module that may be connected to, or integrated within, another device (e.g., a mobile phone, laptop computer, robot, aerial drone, smart appliance, automobile, etc.). The image capture device 110 may include various optical components (e.g., a lens, mirror, shutter, etc.) and one or more image sensor(s) 115 that the image capture device 110 may use to capture an image of a scene. The image sensor(s) 115 may include any of a variety of optical sensors, including a charge-coupled device (CCD) or an active-pixel sensor (APS), such as a complementary metal-oxide-semiconductor (CMOS) sensor. The image sensor 115 may contain an array of picture elements (pixels) made up of photosensitive elements (e.g., photo-diodes, phototransistors, photo-gates, or the like), micro-lenses, and/or micro-electronic components (e.g., amplifying and switching components). The photosensitive elements may receive and convert electromagnetic energy (e.g., visible light) focused upon the elements (e.g., through a lens or other optics) into a digital signal (or an analog signal that is converted into a digital signal using an analog-to-digital converter (ADC)) that can be processed and/or stored by the image capture device 110.

The image sensor(s) 115 may also include a color filter array (CFA), composed of a mosaic of color filters (e.g., polymer filters), placed over the pixel array. Each color filter may reflect and/or absorb undesired color wavelengths such that each image sensor pixel is sensitive to a specific color wavelength. A Bayer filter, for example, may isolate red, green, and blue wavelengths using alternating red (R) and green (G) filters for odd rows and alternating green (G) and blue (B) filters for even rows. In other cases, a CFA can be made with complementary color filters such as cyan, magenta, and yellow, or any other color system. A full-color image 103 (e.g., with intensities of all colors represented at each pixel) may be reconstructed from a captured image by performing a demosaicing algorithm (also known as, color reconstruction or CFA interpolation).

The image capture device 110 may also include one or more processor(s) 112 (e.g., a controller, digital signal processor (DSP), image signal processor (ISP), etc.) and one or more memory(ies) 114 (e.g., volatile or non-volatile memory(ies)). The processor(s) 112, memory(ies) 114, and image sensor(s) 115 may be coupled to and communicate over one or more communication bus(es) 111. The image capture device 110 may also include one or more communication interface(s) 116 coupled to communication bus(es) 111, which the processor(s) 112 can use to communicate with other devices, such as computing device 140. The image capture device 110, for example, may include a Camera Serial Interface (CSI), an Ethernet or Wi-Fi interface, and/or other communication interface over which data can be exchanged with other devices, such as computing device 140.

The processor(s) 112 may include processing logic 120 that can be used (e.g., executed by processor(s) 112) to perform different processes and/or operations. In some embodiments, the processing logic 120 may include image capture logic 121, which may be used to capture and store one or more image(s) using image sensor(s) 115, for example, as image data 102 on volatile and/or non-volatile memory(ies) 114. In some embodiments, processor(s) 112 may also include image processing logic 122, which may be used to process an image (e.g., as part of an image capture process performed by image capture logic 121, a post-capture image enhancement process, or some other process).

In some embodiments, processor(s) 112 may use image capture logic 121 to control image sensor(s) 115 (e.g., by exchanging control signaling over communication bus 111) and receive data output from the image sensor(s) 115 (e.g., over communication bus 111). In some embodiments, for example, image capture logic 121 may direct one or more image sensor(s) 115 to capture an image (e.g., of a physical scene illuminated by one or more illuminants), and in response, the image sensor(s) 115 may return data corresponding to the determined intensity of light (e.g., as measured by the photosensitive elements of the image sensor(s) 115). Image capture logic 121 may store the sensor data returned by image sensor(s) 115, for example, in volatile and/or non-volatile memory(ies) 114. In some embodiments, for example, image capture logic 121 may store raw sensor data (or raw image data) comprising one or more raw image(s) (e.g., as one or more raw image file(s)). In some embodiments, the image capture logic 121 may store CFA image data that may be reconstructed during a image processing to reconstruct a full-color image.

In other embodiments, image capture device 110 may process the raw image(s) further to produce captured image(s) that may be stored, in place of or in addition to the raw sensor data, as captured image data (e.g., as one or more captured image file(s)). In some embodiments, for example, image capture logic 121 may use image processing logic 122 to process the raw image(s) to produce captured image(s), which the image capture logic 121 may store in memory(ies) 114. In some embodiments, for example, image processing logic 122 may be used to process the raw image(s) to produce captured image file(s) that conform to a particular file format. In some embodiments, image processing logic 122 may also (or alternatively) be used to modify or enhance the raw image(s) in some way to produce the captured image(s). By way of example, in some embodiments, image processing logic 122 may be used to perform a demosaicing process to convert raw image(s) into full-color image(s) 103. In some embodiments, the raw image(s) may not be processed further by image capture device 110 (e.g., before they are provided to computing device 140).

Depending on the embodiment, image data 102 may be or include raw sensor data and/or captured image data, comprising one or more raw image file(s) and/or captured image file(s). Each image file (e.g., raw image file or captured image file) may include a set of pixels forming an image (e.g., a raw image or captured image). Each image may have a size (e.g., reflecting a resolution of the image) that may be measured in terms of a quantity of pixels. An image, for example, may have a resolution expressed in terms of a width and height of pixels, for example, 720×480 (e.g., Standard-Definition (SD)), 1920×1800 (e.g., High Definition (HD)), 3840×2160 (e.g., 4K Ultra High Definition (4K UHD)), 7680×4320 (e.g., 8K Ultra High Definition (8K UHD)).

In some embodiments, an image file may also contain metadata regarding an image and its capture. The metadata, for example, may include details about the image (e.g., resolution, color space, etc.), about image capture device 110 and its settings when the image(s) were captured (e.g., make and model, orientation, aperture, shutter speed, focal length, metering mode, and ISO speed), and/or other relevant information (e.g., date, time, and/or location of capture).

An image file may conform to a particular file format, which may define the information conveyed for each pixel of the image, including for example, the number and type of values conveyed for each pixel (e.g., raw pixel sensor values, RGB or YUV values, etc.) and corresponding value size (e.g., 8-bit, 10-bit, etc.) indicating the range that a particular value can take (e.g., 0-255, 0-1023, etc.). An image, for example, may be stored in a "RAW" format (e.g., RAW8, RAW16, etc.) where each image pixel contains the raw sensor output of a corresponding sensor pixel (e.g., of an image sensor 115) that may be represented by a particular number of bits (e.g., 8-bit, 16-bit, 24-bit, etc.). As another example, an image may be stored in an "RGB" format (e.g., RGB24 (or RGB 8:8:8), RGB48 (or RGB 16:16:16), etc.) where each image pixel has an associated red (R), green (G), and blue (B) value, each of which may be represented by a particular number of bits (e.g., 8-bits, 16-bits, etc.).

In some embodiments, image capture logic 121 may use image processing logic 122 to process raw sensor data (e.g., a raw image) to produce an image that conforms to a particular format (e.g., an RGB24 image). In some cases, this may involve reconstructing a full-color image 103 (e.g., where each image pixel comprises an R, G, and B value) from a raw image (e.g., where each image pixel comprises a single value of a corresponding sensor pixel). Metadata associated with a raw image, for example, may indicate the color filter array (CFA) (e.g., a Bayer filter, CYGM filter, etc.) that was used to capture the raw image, which image processing logic 122 can use to determine the color conveyed by a specific sensor pixel. With this information, the image processing logic 122 may be able to perform a demosaicing algorithm to reconstruct a full-color image 103, which can be stored in memory(ies) 114 and/or memory(ies) 144 in the desired file format. The image, for instance, may be stored as an RGB image, where each pixel has an associated red (R), green (G), and blue (B) value (e.g., an RGB24 image (or RGB 8:8:8 image) where each color is represented by 8-bits of data). As another example, in some embodiments, image processing logic 122 may be used to convert an image from one color model or domain to another (e.g., an RGB model to a YUV model). By way of example, image capture logic 122 may convert an RGB image, where pixel color is represented by red (R), green (G), and blue (B) component values, to a YUV image, where pixel color is represented by a luminance (or luma) component (Y) and a pair of chromaticity components (U and V), reflecting a relative redness and relative blueness of the pixel.

The computing device 140 may include one or more processor(s) 142 (e.g., a digital signal processor (DSP), image signal processor (ISP) etc.), memory(ies) 144 (e.g., volatile or non-volatile memory), and a communication interface(s) 146. The processor(s) 142, memory(ies) 144, and communication interface(s) 146 may be coupled to and communicate over communication bus(es) 141. The processor(s) 142 can use communication interface(s) 146 to communicate with other devices such as image capture device 110. The computing device 140, for example, may include a Camera Serial Interface (CSI), an Ethernet or Wi-Fi interface, and/or other communication interface over which data can be exchanged with other devices, such as computing device 140. The processor(s) 142 may include processing logic 150 that can be used (e.g., executed by processor(s) 142) to perform different processes and/or operations. In some embodiments, for example, the processor(s) 142 may include image capture logic 151 and image processing logic 152, which are discussed in further detail herein.

The image capture logic 151 may be used by the processor(s) 142 of the computing device 140 to capture image data from an image source such as image capture device 110. The image capture logic 151, for example, may be used to acquire image data 102 from the image capture device 110 via communication interface(s) 146, which may be stored in volatile and/or non-volatile memory(ies) 144 for further processing. In some embodiments, computing device 140 may externally manage the image capture device 110 and control operation thereof. In some embodiments, for example, image capture logic 151 may initiate an image capture process on image capture device 110 (e.g., by exchanging control signaling with image capture device 110 over communication interface(s) 146) and may receive image data from image capture device 110 in response (e.g., via communication interface(s) 146).

Depending on the embodiment, image data 102 may be or include sensor data and/or captured image data, comprising one or more raw image file(s) and/or captured image file(s). Each image file (e.g., raw image file or captured image file) may comprise a set of pixels forming an image (e.g., a raw image or captured image). Each image may have a size (e.g., reflecting a resolution of the image) that may be measured in terms of a quantity of pixels. Image data 102, for example, may include an image having a resolution expressed in terms of a width and height of pixels, for example, 720×480 (e.g., Standard-Definition (SD)), 1920×1800 (e.g., High Definition (HD)), 3840×2160 (e.g., 4K Ultra High Definition (4K UHD)), 7680×4320 (e.g., 8K Ultra High Definition (8K UHD)). In some embodiments, an image may also contain metadata regarding the image and its capture. The metadata, for example, may include details about the image (e.g., resolution, color space, etc.), about image capture device 110 and its settings when the image(s) were captured (e.g., make and model, orientation, aperture, shutter speed, focal length, metering mode, and/or ISO speed), and/or other relevant information (e.g., date, time, and/or location of capture).

In at least one embodiment, the processing logic 152 may include an image compression component 154. The image compression component 154 may be used to perform compression of images. In at least one embodiment, image compression component 154 May provide a compression scheme for high dynamic range (HDR) images in image signal processing (ISP) pipelines. In at least one embodiment, the compression scheme may be implemented according to a compression curve associated with the image sensor 115. In certain implementations, image compression component 154 may provide a compression scheme to process image data 102 generated at an initial high bit depth from image sensor 115, such that the data can be compressed to a lower bit depth than the initial high bit depth. In at least one embodiment, a color correction matrix (CCM) may be applied to adjust colors of an image compressed by the image compression component 154 to correct color inaccuracies introduced during compression.

In at least one embodiment, the processing logic 152 includes CCM calibration component 153 to calibrate a CCM associated with image processing logic 152 according to novel techniques described herein. Specifically, CCM calibration component 153 may decompose target image color data into brightness and color ratio components and compress the components separately to maintain the color ratio during target image generation, thereby preserving color accuracy. In at least one embodiment, the brightness component of a target image can be compressed according to a compression curve associated with image compression component 154. The compression curve may be a non-linear function selected to compress an HDR image from the bit-depth (e.g., 24 bits) of the image sensor 115 to a bit-depth of the image processing logic 152 (which may be lower than the sensor bit-depth, such as 20 bits), where a level of compression of a certain region of the image is based on a pixel value of the region according to the compression curve. A bit-depth of an image may represent the amount of color information stored in the image, such that the higher the bit depth of the image, the more colors it can store. As an example, the simplest image may be a 1 bit image, which can only show two colors, black and white. In one or more embodiments, the compression curve may be generalized with two parameters (a constant and a power). The power of the compression curve may be based on a target compression ratio (e.g., ratio of input bit-depth to output bit-depth). As an example, the brightness component of the pixel value of the region of the image may be a luminance value of the region of the image.

In at least one embodiment, the CCM calibration component 153 can map (compress) luminance values from the bit-depth associated with the image sensor 115 to a bit-depth associated with the ISP bit-depth using the compression curve. Luminance gain can be computed for each pixel as the ratio between the luminance value before and after the compression curve is applied to each pixel. The CCM calibration component 153 can apply the luminance gain to each color channel of the corresponding pixel such that color ratios associated with each color channel are maintained in the compressed target image. The CCM calibration component 153 can adjust a CCM associated with image processing logic 122 and/or image processing logic 152 using the compressed target image and reference color values associated with the target images. The CCM of a compression scheme is accordingly calibrated by compressing the luminance values according to the compression curve and compressing color channels using luminance gain value when compressing a target image. The adjusted/calibrated CCM may be implemented within the image compression component 154 to correct color inaccuracies of images captured by the image sensor and processed by image processing logic 152.

It will be appreciated that the embodiments illustrated in FIG. 1 and described above are merely illustrative and that those of skill in the art will understand and appreciate that additional and alternative embodiments are possible. For example, while illustrated and described as separate components, in some embodiments, the image capture device 110 and computing device 140 may be combined. As another example, in some embodiments, processor(s) 112 may include at least a portion of the processing logic 150 of processor(s) 142 and may be configured to perform the functionality described herein with respect thereto.

Figure 2:
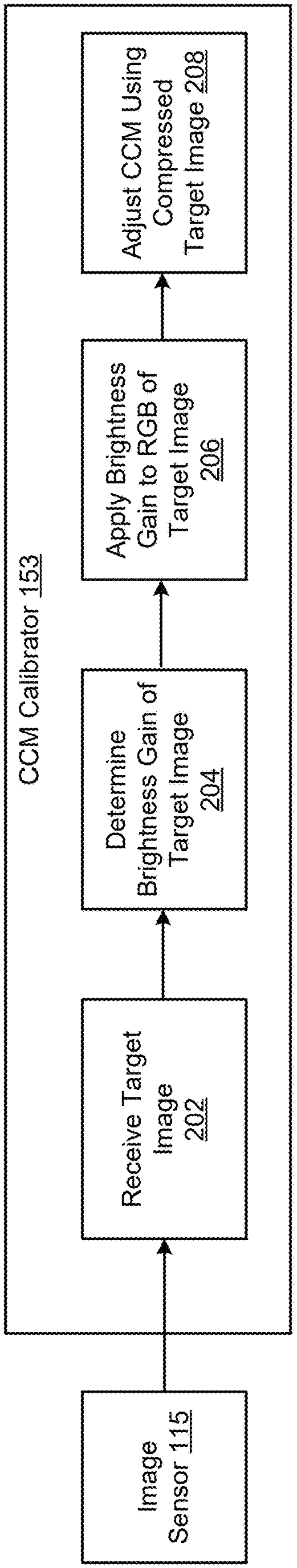
FIG. 2 illustrates an example CCM calibration component for performing CCM calibration for HDR images in an ISP pipeline, in accordance with at least one embodiment of the present disclosure.

FIG. 2 illustrates an example CCM calibration component 153 for performing CCM calibration for HDR images in an ISP pipeline, in accordance with at least one embodiment of the present disclosure. In at least one embodiment, an image compression component 153 may provide a CCM adjustment scheme to allow an ISP pipeline process data generated at an initial high bit depth from an image sensor 115, such that the data can be compressed at an image signal processor (ISP) pipeline (e.g., image processing logic 122, image processing logic 153, etc.) to a lower bit depth than the initial high bit depth, while preserving color accuracy.

In at least one embodiment, the image sensor 115 may capture a target image at a first bit-depth. The image sensor 115 may be, for example, an HDR image sensor that captures images at a high bit-depth (e.g., a bit-depth of 24 bits). The image sensor 115 may be an HDR sensor having a bit depth of, for example, 20 bits, 24 bits, 26 bits, 32 bits, and so on. A processing device (e.g., a processing device at the image sensor, a processing device separate from the image sensor, etc.) may compress the image data from the first bit depth to a lower second bit depth (e.g., from a bit-depth of 24 bits to a bit-depth of 12 bits). The bit-depth to which the image is compressed may be based on a bandwidth of a connection between the image sensor 115 and an ISP pipeline. The second bit-depth may be, for example, 8 bits, 10 bits, 12 bits, 14 bits, 16 bits, 18 bits, and so on. For example, an image compression component of the ISP pipeline can receive raw image data from the image sensor 115 and compress the raw image data from a bit-depth of 24 bits to a bit-depth of 20 bits.

In at least one embodiment, to preserve color accuracy when compressing raw image data in an ISP pipeline, the CCM calibration component 153 may adjust a color correction matrix (CCM) associated with the ISP pipeline. At operation 202, the image compression component 153 may receive a target image capture by the image sensor 115. A target image can be a specific image with known color features used at a reference or a target in the ISP pipeline color correction calibration process. In some embodiments, the target image can be an image of a color chart or a color checker including multiple regions (e.g., patches, squares, pixel, block of pixels, etc.) with known and standard color values. For example, the target image may be an image of a color check chart including a checkerboard format of 24 colored squares encompassing a range of known color values. Colors associated with the target image captured by the image sensor 115 may differ from the known color values associated with the captured target image.

At operation 204, the image compression component 153 can determine brightness gain values of the target image. Brightness gain is the amplification of brightness levels in an image captured by the image sensor 115 during image compression. In some embodiments, the target image captured by the image sensor 115 may be RGB target image data. For example, CCM calibration component 153 may receive raw RGB target image data from the image sensor 115. In some embodiments, the brightness values, such as luminance values, can be derived from RGB values based on a weighted sum of the RGB components according to the sensitivity of the human eye to different color components. For example, luminance (L) can be computed according to equation (1):

$$L=.25R+.5G+.25B \tag{1}$$

In equation (1), L can represent the computed luminance value of a particular pixel of the target image, and the particular pixel has an associated red (R), green (G), and blue (B) value, each of which may be represented by a particular value. The coefficients 0.25, 0.5, and 0.25 are provided herein by way of example, and not by way of limitation, noting that other coefficients may be used herein to calculate luminance values based on RGB image data.

In at least one embodiment, to compute Luminance values associated with the target image after compression, the CCM calibration component 153 may compress the target image according to a dynamic range compression (DRC) algorithm associated with the ISP. In an illustrative example, the image compression component 153 may compress the target image data according to a compression curve associated with the ISP. The compression curve may be selected to compress an HDR image from the sensor bit-depth to the ISP bit-depth, where a level of compression of a certain region of the image is based on a pixel value of the region according to the compression curve. In one or more embodiments, the compression curve may be generalized with two parameters (a constant and a power) to allow for a linear approximation initially without degrading image quality in embodiments. The power of the power curve may be based on a target compression ratio (e.g., ratio of input bit-depth to output bit-depth). For example, the image compression component may utilize a non-linear compression curve to compress 24 bits of linear target data (x) to 20 bits of target data (y) using the following equation (2), where β is the constant parameters and α is the power parameter:

$$y=\beta*x^{\alpha} \tag{2}$$

In at least one embodiment, CCM calibration component 153 may use the equation (2) to generate new target image data values (e.g., 20 bit-depth) from an original bit-depth target image (e.g., a 24 bit target image) that is generated by image sensor 115. The CCM calibration component 153 may calculate luminance values of the compressed target image according to equation (1). Additionally, the CCM calibration component 153 may compute luminance gain according to the following equation (3), where $L^{\alpha}$ are luminance values after applying the compression curve to the target image data, and L are luminance values before applying the compression curve to the target image data:

$$\text{gain}=L^{\alpha}/L \tag{3}$$

Luminance gain, as calculated using equation (3) can be pixel intensity adaptive, such that luminance gain can be calculate for each pixel according to equations (1), (2), and (3).

In at least one embodiment, at operation 206, the CCM calibration component 153 can apply brightness (luminance) gain to the RGB components of the uncompressed target image data. Accordingly, luminance values of the target image data are mapped (compressed) to the ISP bit-depth based on the compression curve of the ISP, and RGB values of the target image data are mapped (compressed) to the ISP bit-depth according to luminance gain values. RGB values and brightness (luminance) values can compressed separately such that hue, saturation, and color ratios are preserved while the dynamic range brightness values are compressed to match ISP bit-depth in the compressed target image.

In an illustrative example, RGB data associated with a given pixel of the target image may be represented by the following values: (1000, 2000, 3000), where 1000 corresponds to the red (R) value, 2000 corresponds to the green (G) value, and 3000 corresponds to the blue (B) value. The image compression component 153 may use the following non-linear compression curve to compress each component of target data (x) to target data (y) using the following compression equation: $y=3.6869*x^{0.7549}$, such that the target RGB data compressed according to the compression equation is equal to the following RGB values: (678, 1145, 1554).

The CCM calibration component 153 can calculate luminance gain according to equation (3) where $L^{\alpha}=(0.25*678+0.5*1145+0.25*1554)=1131$; and $L=(0.25*1000+0.5*2000+0.25*3000)=2000$. Accordingly, $L^{\alpha}/L$ (gain)=1131/2000. The CCM calibration component 153 can the apply the calculated luminance gain values to each component of corresponding RGB value associated with the target image. As such, the compressed target RGB values are equivalent to the following: (1131/2000)*(1000, 2000, 3000)=(565.5, 1131, 1696.5). Using this methodology to compress target RGB values can resultantly preserve color ratios before and after target image compression (e.g., 565.5/1131 is equivalent to 1000/2000) while luminance values are compressed according to a non-linear compression curve, such as equation (2).

In at least one embodiment, at operation 208, CCM calibration component 153 can adjust/calibrate a color correction matrix (CCM) associated with the ISP pipeline using the compressed target image. To adjust the CCM associated with the ISP pipeline, the CCM calibration component 153 may extract color values (e.g., RGB values) from the compressed target image and compare the extracted values to reference values associated with the target image that represent the actual color values associated with the target image. The CCM calibration component 153 can calculate color errors between the color values extracted from the compressed target image and the reference using one or more color differences metrics. Color differences metrics are quantitative measures used to assess a perceptual difference between two colors. For example, the CCM calibration component may use the Delta E (ΔE) formula, the CIE76 (ΔE76) formula, the CIE94 (ΔE94) formula or the like to quantify perceptual color difference between extracted color values and reference color values. CCM calibration component 153 may employ an optimization algorithm, such as least squares regression or other numerical optimization algorithms, to iteratively adjust CCM coefficients to reduce overall color errors.

In at least one embodiment, the CCM calibration component 153 can convert the compressed target image to a perceptually uniform color space to assess perceptual differences between the color values extracted from the compressed target image to the reference values. Perceptual uniformity ensures a consistent changes in coordinates corresponds to a consistent change in color. Such a characteristic may be crucial when comparing extracted values with reference values to quantify perceptual differences in color. In some embodiments, the CCM calibration component 153 may convert the compressed target image to a CIE 1931 (XYZ) color space to perform CCM calibration (e.g., convert from RGB to XYZ). In some embodiments, the CCM calibration component 153 can convert the compressed target image to a CIE Lab (LAB) color space to perform CCM calibration (e.g., convert from XYZ to LAB). It is appreciated that XYZ and LAB color spaces are used herein by way of example, and not by way of limitation, noting that the CCM calibration component 153 may calibrate a CCM matrix within any perceptually uniform or non-uniform color space.

In at least one embodiment, after adjusting/calibrating the CCM, the calibrated CCM can be deployed within an ISP pipeline associated with the image sensor 115, such as within image compression component 154. The calibrated CCM can be applied (e.g., in real-time) during an image capture and compression process. As subsequent image data is generated by the image sensor 115 and compressed in the ISP pipeline, the calibrated CCM can adjust color information to correct for color inaccuracies introduced by the image sensor 115, the compression curve, and other components. For example, the ISP pipeline may receive a subsequent image data captured by the image sensor 115 and compress the subsequent image according to a compression curve, such as the compression curve associated with equation (2). The calibrated CCM can transform the subsequent compressed image data into a standard color space (e.g., sRGB) and correct color inaccuracies introduced by a non-linear compression curve, the image sensor 115, and/or other components associated with the ISP pipeline.

Figure 3:
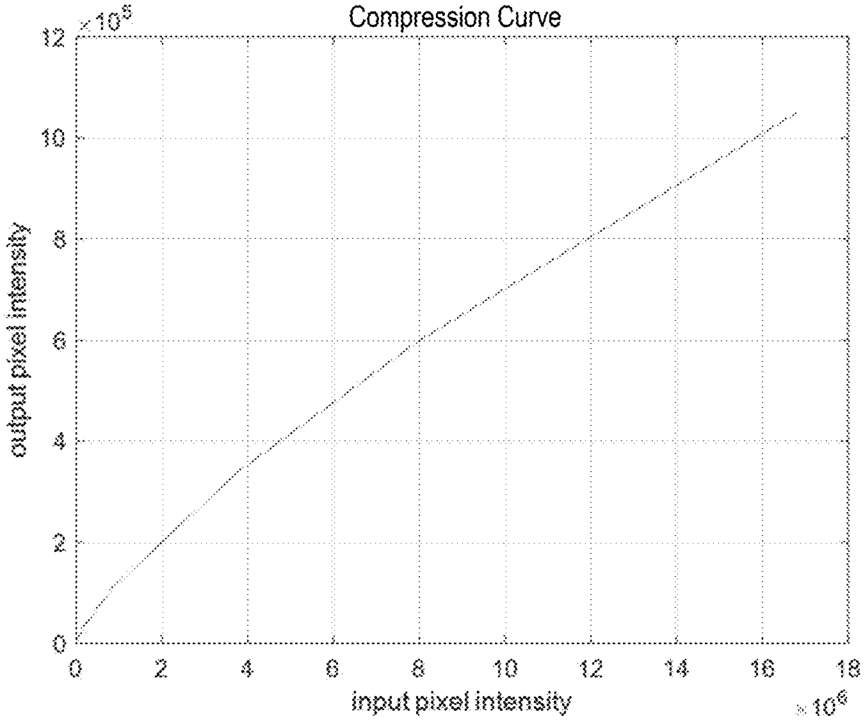
FIG. 3 illustrates an example compression curve that may be used for compressing HDR images from a camera without impacting color accuracy of the images, in accordance with at least one embodiment of the present disclosure.

FIG. 3 illustrates an example compression curve 300 that can be used for compressing images (e.g., such as HDR images) from a camera without impacting color accuracy of the images, in accordance with at least one embodiment of the present disclosure. In at least one embodiment, processing logic (e.g., image compression component 153 of FIG. 1) may utilize the power curve 300 for compressing HDR images. In at least one embodiment, the processing logic may perform CCM calibration/adjustment such that a brightness component of a target image is compressed according to the power curve 300 and color components of the target image are compressed according to luminance gain values, as described above. In at least one embodiment, the power curve 300 can be associated with an image signal processing (ISP) pipeline of a particular image sensor (e.g., an HDR image sensor), such as image sensor 115 of FIG. 1. The processing logic can calibrate/adjust a CCM associated with the ISP pipeline such that the subsequent images captured by the image sensor can be compressed according to the power curve 300 without impacting color accuracy of the image.

Figure 4:
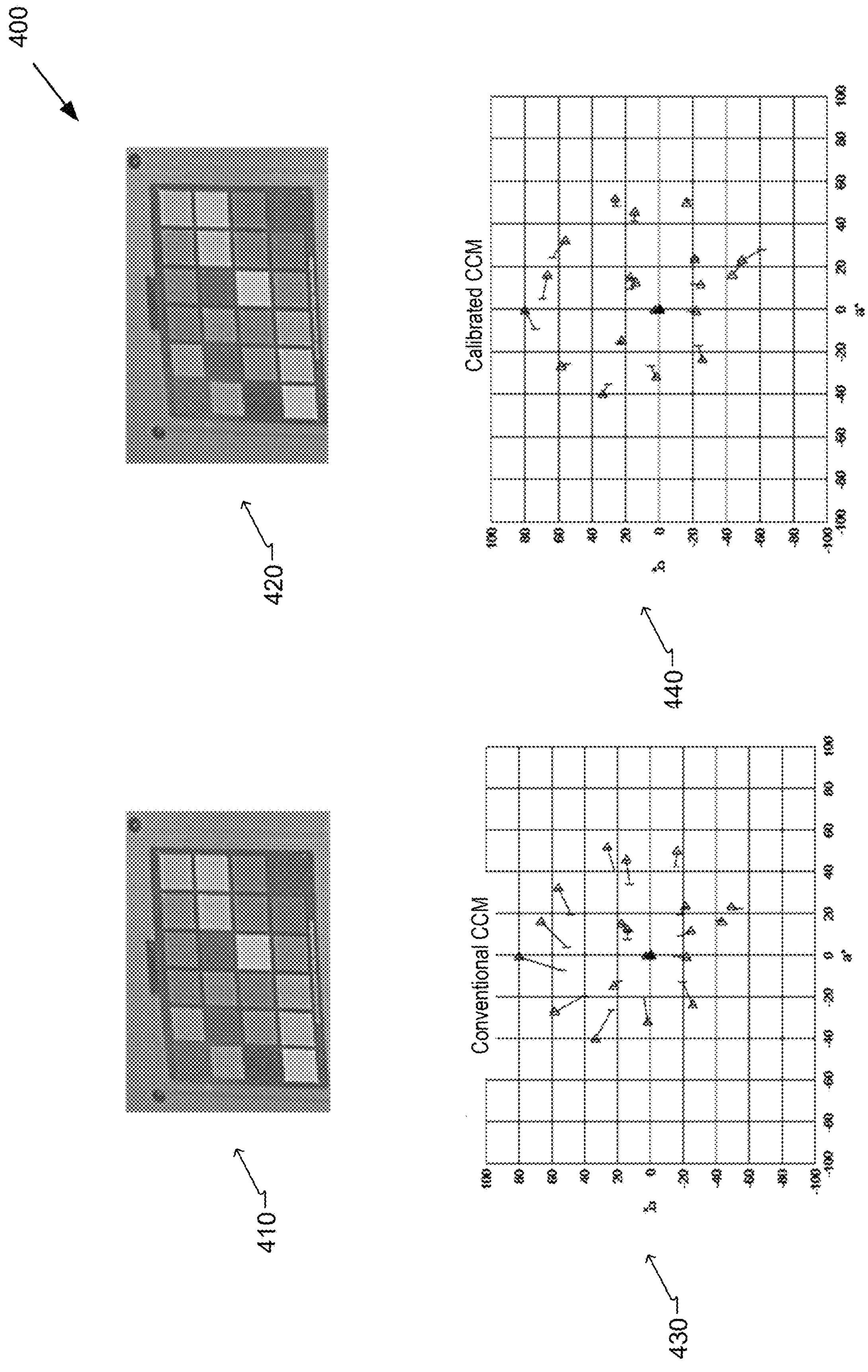
FIG. 4 illustrates the impact of adjusting a CCM in an ISP pipeline with and without the techniques proposed herein, in accordance with at least one embodiment of the present disclosure.

FIG. 4 illustrates the impact of adjusting a CCM in an ISP pipeline with and without the techniques proposed herein, in accordance with at least one embodiment of the present disclosure. As shown in FIG. 4, image 410 is captured by a higher bit-depth sensor (e.g., 24 bit sensor) and processed by lower bit-depth ISP (e.g., 20 bit ISP) according to conventional techniques. Image 420, corresponding to image 410, was captured by a bit sensor (e.g., 24 bit image sensor) and processed by an ISP (e.g., 20 bit ISP) with an adjusted/calibrated CCM using one or more of the disclosed implementations. As shown in FIG. 4, image 420 shows greater color accuracy compared to image 410, while the final bit-depth that is shown is the same.

As shown in FIG. 4, vector field 430 corresponds to image 410 and illustrates vectors representing color differences after processing the image 410 according to conventional techniques. Vector field 440 corresponds to image 420 and illustrates vectors representing color differences after processing the image 420 according to one or more techniques described herein. As shown, vector field 430 corresponding to image 410 shows more color difference than vector field 440 corresponding to image 420 that was processed with a CCM calibrated according to embodiments described herein.

Figure 5:
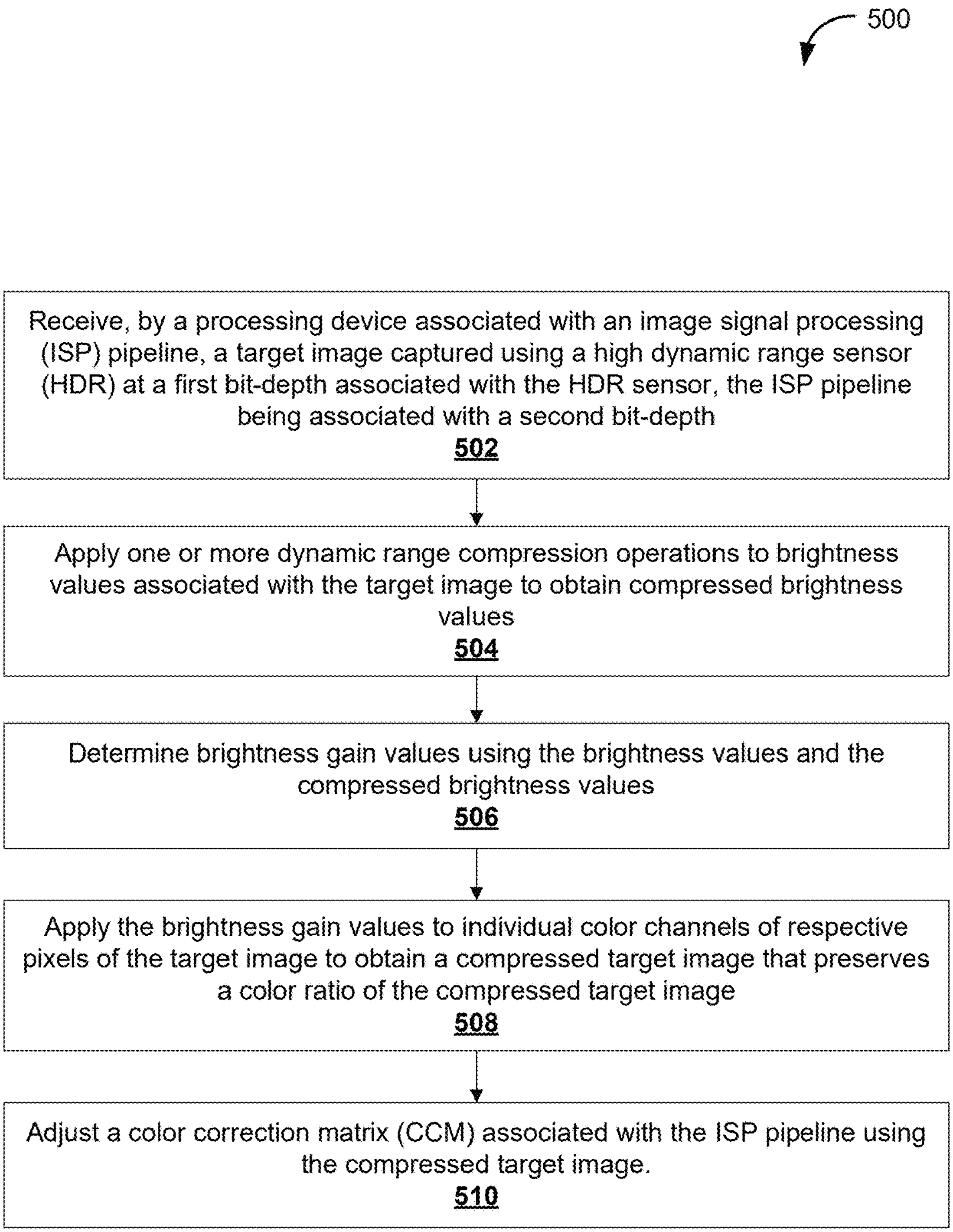
FIG. 5 illustrates a flow diagram of an example method of calibrating a CCM for a high dynamic range sensor, in accordance with at least one embodiment of the present disclosure.

FIG. 5 illustrates a flow diagram of an example method 500 of calibrating a color correction matrix (CCM) for a high dynamic range sensor, in accordance with at least one embodiment of the present disclosure. For the sake of simplicity and clarity, method 500 are depicted and described as a series of operations. However, in accordance with the present disclosure, such operations may be performed in other orders and/or concurrently, and with other operations not presented or described herein. Furthermore, not all illustrated operations may be required in implementing methods in accordance with the present disclosure. Those of skill in the art will also understand and appreciate that the methods could be represented as a series of interrelated states or events via a state diagram. Additionally, it will be appreciated that the disclosed methods are capable of being stored on an article of manufacture. The term "article of manufacture," as used herein, is intended to encompass a computer-readable device or storage media provided with a computer program and/or executable instructions that, when executed, affect one or more operations. In some embodiments, the method 500 can be performed by processing logic of a computing device (e.g., using processor 142 of computing device 140 shown in FIG. 1).

At operation 502 of method 500, the processing logic can receive a target image captured using a high dynamic range (HDR) sensor at a first bit-depth associated with the HDR sensor. In some embodiments, the processing logic is associated with an image signal processing (ISP) pipeline and the ISP pipeline is associated with a second bit-depth. In at least one embodiment, the second bit-depth is lower than the first bit-depth. For example, the first bit-depth may be 24 bits and the second bit-depth may be 20 bits. In at least one embodiment, target image is a color chart including multiple regions of known color values.

At operation 504 of method 500, the processing logic can apply one or more dynamic range compression operations to brightness values associated with the target image to obtain compressed brightness values. In at least one embodiment, the one or more dynamic range compression operations are based on a compression curve associated with the ISP pipeline.

At operation 506 of method 500, the processing logic can determine brightness gain values using the brightness values and the compressed brightness values. In at least one embodiment, the brightness gain values are scaling factors between the brightness values and the compressed brightness values.

At operation 508 of method 500, the processing logic can apply the brightness gain values to individual color channels of respective pixels of the target image to obtain a compressed target image that preserves a color ratio of the compressed target image.

At operation 510 of method 500, the processing logic can adjust a color correction matrix (CCM) associated with the ISP pipeline using the compressed target image. In at least one embodiment, to adjust the CCM associated with the ISP pipeline using the compressed target image, the processing logic can convert the compressed target image from a color space associated with the high dynamic range sensor to a perceptually uniform color space, analyze color differences between known color values associated with the target image and color values associated with in the compressed target image in the perceptually uniform color space, and determine CCM coefficients based on the color differences.

In at least one embodiment, the processing logic can further receive a subsequent image captured at the first bit-depth by the high dynamic range sensor. The processing logic may apply the one or more dynamic range compression operations to the subsequent image to obtain a compressed subsequent image at the second bit-depth, and perform color correction on the compressed subsequent image using the adjusted CCM. In at least one embodiment, the CCM transforms a color space of the compressed subsequent image from a nonlinear color space associated with the high dynamic range sensor to a linear color space (e.g., sRGB).

Figure 6A:
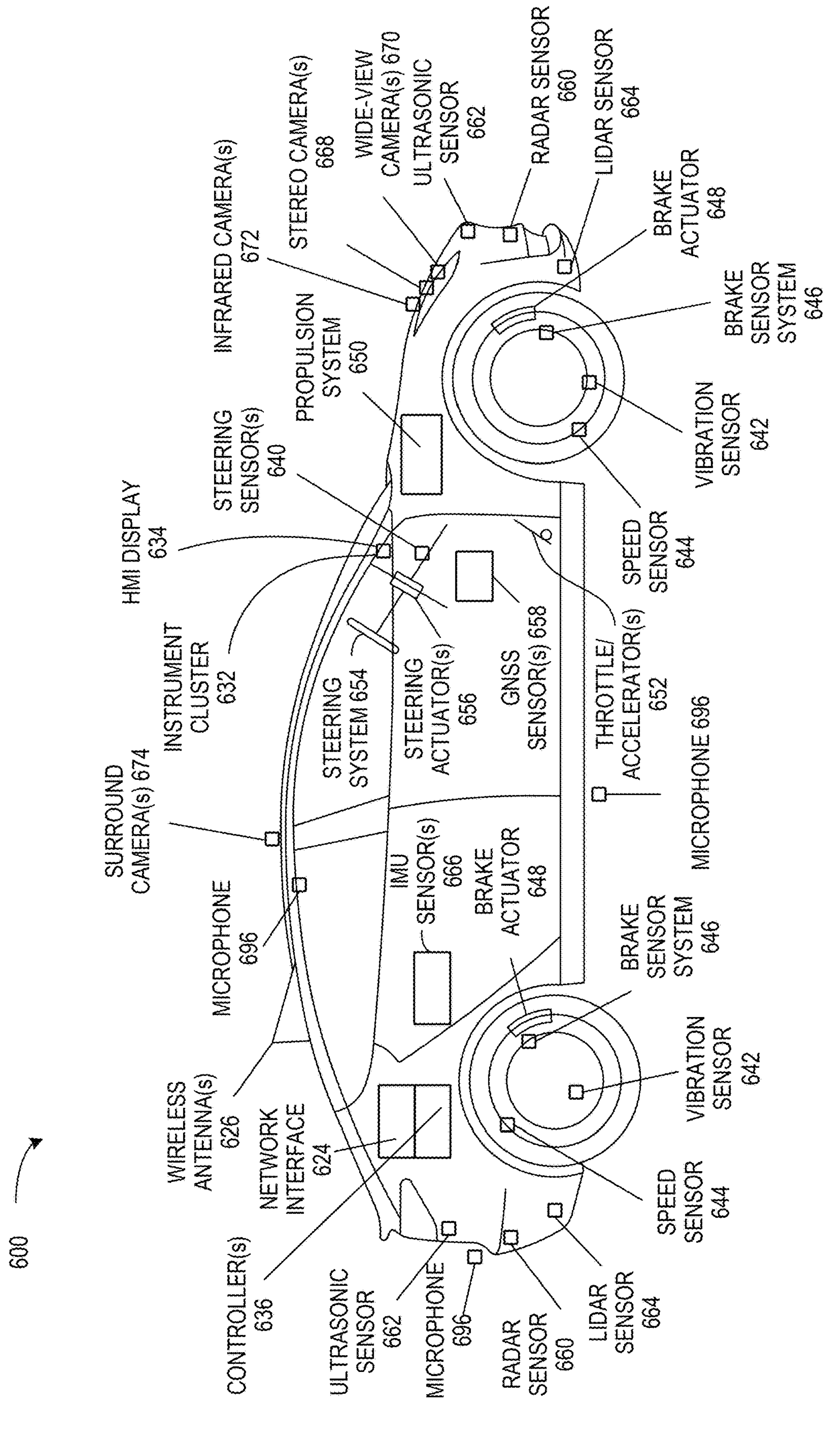
FIG. 6A illustrates an example of an autonomous vehicle, according to at least one embodiment.

FIG. 6A illustrates an example of an autonomous vehicle 600, according to at least one embodiment. In at least one embodiment, autonomous vehicle 600 (alternatively referred to herein as "vehicle 600") may be, without limitation, a passenger vehicle, such as a car, a truck, a bus, and/or another type of vehicle that accommodates one or more passengers. In at least one embodiment, vehicle 600 may be a semi-tractor-trailer truck used for hauling cargo. In at least one embodiment, vehicle 600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 600 may be capable of functionality in accordance with one or more of Level 1 through Level 5 of autonomous driving levels. For example, in at least one embodiment, vehicle 600 may be capable of conditional automation (Level 3), high automation (Level 4), and/or full automation (Level 5), depending on embodiment.

In at least one embodiment, vehicle 600 may include, without limitation, components such as a chassis, a vehicle body, wheels (e.g., 2, 4, 6, 8, 18, etc.), tires, axles, and other components of a vehicle. In at least one embodiment, vehicle 600 may include, without limitation, a propulsion system 650, such as an internal combustion engine, hybrid electric power plant, an all-electric engine, and/or another propulsion system type. In at least one embodiment, propulsion system 650 may be connected to a drive train of vehicle 600, which may include, without limitation, a transmission, to enable propulsion of vehicle 600. In at least one embodiment, propulsion system 650 may be controlled in response to receiving signals from a throttle/accelerator(s) 652.

In at least one embodiment, a steering system 654, which may include, without limitation, a steering wheel, is used to steer vehicle 600 (e.g., along a desired path or route) when propulsion system 650 is operating (e.g., when vehicle 600 is in motion). In at least one embodiment, steering system 654 may receive signals from steering actuator(s) 656. In at least one embodiment, a steering wheel may be optional for full automation (Level 5) functionality. In at least one embodiment, a brake sensor system 646 may be used to operate vehicle brakes in response to receiving signals from brake actuator(s) 648 and/or brake sensors.

In at least one embodiment, controller(s) 636, which may include, without limitation, one or more system on chips ("SoCs") (not shown in FIG. 6A) and/or graphics processing unit(s) ("GPU(s)"), provide signals (e.g., representative of commands) to one or more components and/or systems of vehicle 600. For instance, in at least one embodiment, controller(s) 636 may send signals to operate vehicle brakes via brake actuator(s) 648, to operate steering system 654 via steering actuator(s) 656, to operate propulsion system 650 via throttle/accelerator(s) 652. In at least one embodiment, controller(s) 636 may include one or more onboard (e.g., integrated) computing devices that process sensor signals, and output operation commands (e.g., signals representing commands) to enable autonomous driving and/or to assist a human driver in driving vehicle 600. In at least one embodiment, controller(s) 636 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In at least one embodiment, a single controller may handle two or more of above functionalities, two or more controllers may handle a single functionality, and/or any combination thereof.

In at least one embodiment, controller(s) 636 provide signals for controlling one or more components and/or systems of vehicle 600 in response to sensor data received from one or more sensors (e.g., sensor inputs). In at least one embodiment, sensor data may be received from, for example and without limitation, global navigation satellite systems ("GNSS") sensor(s) 658 (e.g., Global Positioning System sensor(s)), RADAR sensor(s) 660, ultrasonic sensor(s) 662, LIDAR sensor(s) 664, inertial measurement unit ("IMU") sensor(s) 666 (e.g., accelerometer(s), gyroscope(s), a magnetic compass or magnetic compasses, magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range cameras (not shown in FIG. 6A), mid-range camera(s) (not shown in FIG. 6A), speed sensor(s) 644 (e.g., for measuring speed of vehicle 600), vibration sensor(s) 642, steering sensor(s) 640, brake sensor(s) (e.g., as part of brake sensor system 446), and/or other sensor types.

In at least one embodiment, one or more of controller(s) 636 may receive inputs (e.g., represented by input data) from an instrument cluster 632 of vehicle 600 and provide outputs (e.g., represented by output data, display data, etc.) via a human-machine interface ("HMI") display 634, an audible annunciator, a loudspeaker, and/or via other components of vehicle 600. In at least one embodiment, outputs may include information such as vehicle velocity, speed, time, map data (e.g., a High Definition map (not shown in FIG. 6A), location data (e.g., vehicle's 600 location, such as on a map), direction, location of other vehicles (e.g., an occupancy grid), information about objects and status of objects as perceived by controller(s) 636, etc. For example, in at least one embodiment, HMI display 634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 600 further includes a network interface 624 which may use wireless antenna(s) 626 and/or modem(s) to communicate over one or more networks. For example, in at least one embodiment, network interface 624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000") networks, etc. In at least one embodiment, wireless antenna(s) 626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. protocols.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the autonomous vehicle 600 of FIG. 6A for performing image processing operations, including CCM calibration operations.

Figure 6B:
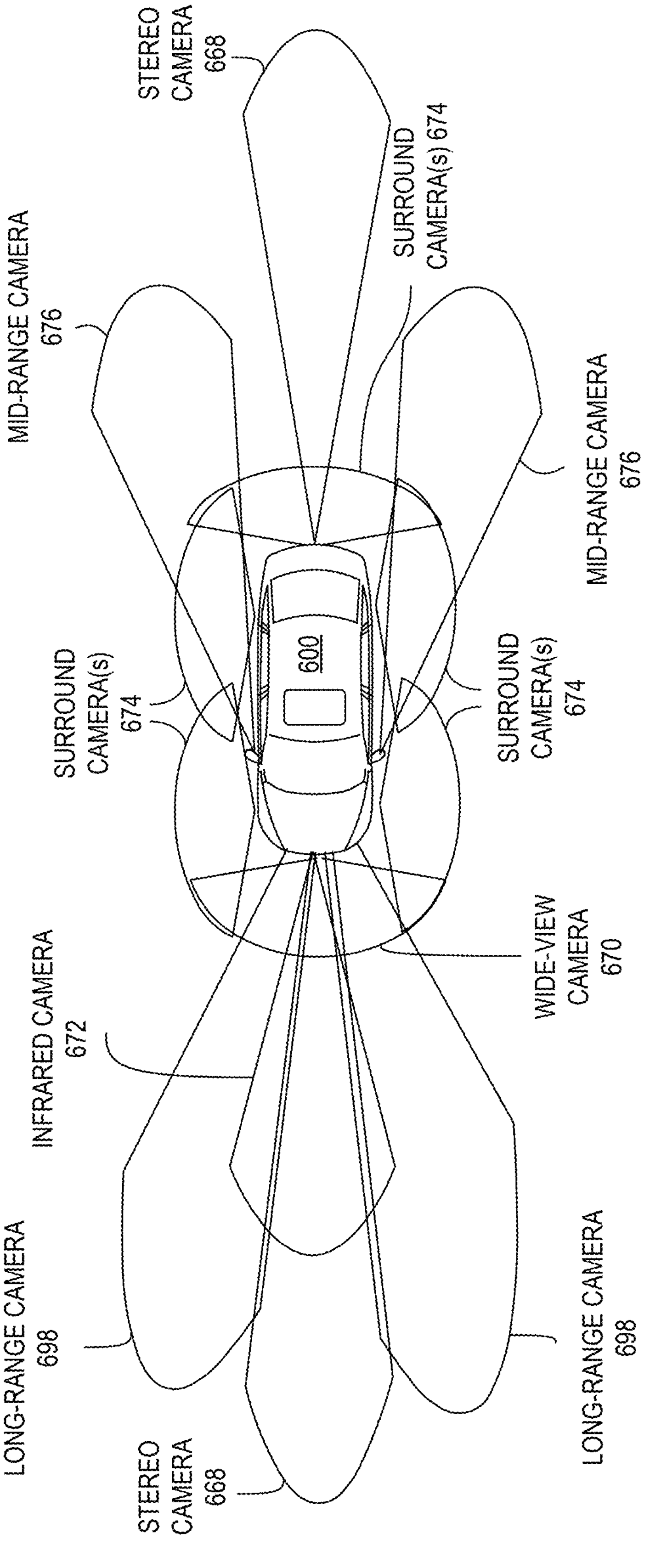
FIG. 6B illustrates an example of camera locations and fields of view for the autonomous vehicle of FIG. 6A, according to at least one embodiment.

FIG. 6B illustrates an example of camera locations and fields of view for autonomous vehicle 600 of FIG. 6A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 600.

In at least one embodiment, camera types for cameras may include, but are not limited to, digital cameras that may be adapted for use with components and/or systems of vehicle 600. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within vehicle 600 (e.g., reflections from dashboard reflected in windshield mirrors) which may interfere with camera image data capture abilities. With reference to wing-mirror mounting assemblies, in at least one embodiment, wing-mirror assemblies may be custom 3D printed so that a camera mounting plate matches a shape of a wing-mirror. In at least one embodiment, camera(s) may be integrated into wing-mirrors. In at least one embodiment, for side-view cameras, camera(s) may also be integrated within four pillars at each corner of a cabin.

In at least one embodiment, cameras with a field of view that include portions of an environment in front of vehicle 600 (e.g., front-facing cameras) may be used for surround view, to help identify forward facing paths and obstacles, as well as aid in, with help of one or more of controller(s) 636 and/or control SoCs, providing information critical to generating an occupancy grid and/or determining preferred vehicle paths. In at least one embodiment, front-facing cameras may be used to perform many similar ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, a wide-view camera 670 may be used to perceive objects coming into view from a periphery (e.g., pedestrians, crossing traffic or bicycles). Although only one wide-view camera 670 is illustrated in FIG. 6B, in other embodiments, there may be any number (including zero) wide-view cameras on vehicle 600. In at least one embodiment, any number of long-range camera(s) 698 (e.g., a long-view stereo camera pair) may be used for depth-based object detection, especially for objects for which a neural network has not yet been trained. In at least one embodiment, long-range camera(s) 698 may also be used for object detection and classification, as well as basic object tracking.

In at least one embodiment, any number of stereo camera(s) 668 may also be included in a front-facing configuration. In at least one embodiment, one or more of stereo camera(s) 668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of an environment of vehicle 600, including a distance estimate for all points in an image. In at least one embodiment, one or more of stereo camera(s) 668 may include, without limitation, compact stereo vision sensor(s) that may include, without limitation, two camera lenses (one each on left and right) and an image processing chip that may measure distance from vehicle 600 to target object and use generated information (e.g., metadata) to activate autonomous emergency braking and lane departure warning functions. In at least one embodiment, other types of stereo camera(s) 668 may be used in addition to, or alternatively from, those described herein.

In at least one embodiment, cameras with a field of view that include portions of environment to sides of vehicle 600 (e.g., side-view cameras) may be used for surround view, providing information used to create and update an occupancy grid, as well as to generate side impact collision warnings. For example, in at least one embodiment, surround camera(s) 674 (e.g., four surround cameras as illustrated in FIG. 6B) could be positioned on vehicle 600. In at least one embodiment, surround camera(s) 674 may include, without limitation, any number and combination of wide-view cameras, fisheye camera(s), 360-degree camera(s), and/or similar cameras. For instance, in at least one embodiment, four fisheye cameras may be positioned on a front, a rear, and sides of vehicle 600. In at least one embodiment, vehicle 600 may use three surround camera(s) 674 (e.g., left, right, and rear), and may leverage one or more other camera(s) (e.g., a forward-facing camera) as a fourth surround-view camera.

In at least one embodiment, cameras with a field of view that include portions of an environment behind vehicle 600 (e.g., rear-view cameras) may be used for parking assistance, surround view, rear collision warnings, and creating and updating an occupancy grid. In at least one embodiment, a wide variety of cameras may be used including, but not limited to, cameras that are also suitable as a front-facing camera(s) (e.g., long-range cameras 698 and/or mid-range camera(s) 676, stereo camera(s) 468), infrared camera(s) 672, etc.), as described herein.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the autonomous vehicle 600 of FIG. 6B for performing image processing operations, including CCM calibration operations.

Figure 6C:
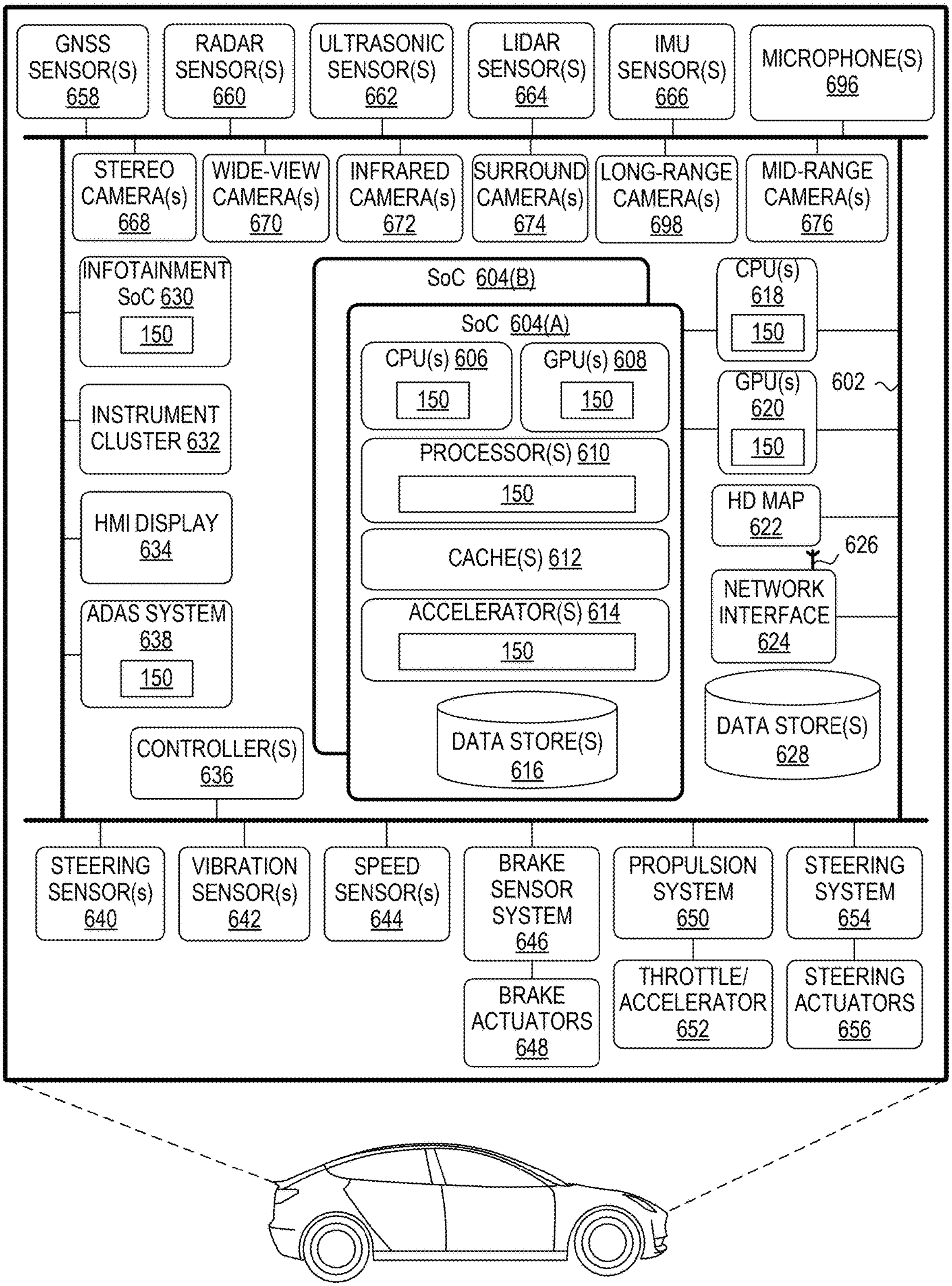
FIG. 6C is a block diagram illustrating an example system architecture for the autonomous vehicle of FIG. 6A, according to at least one embodiment.

FIG. 6C is a block diagram illustrating an example system architecture for autonomous vehicle 600 of FIG. 6A, according to at least one embodiment. In at least one embodiment, each of components, features, and systems of vehicle 600 in FIG. 6C is illustrated as being connected via a bus 602. In at least one embodiment, bus 602 may include, without limitation, a CAN data interface (alternatively referred to herein as a "CAN bus"). In at least one embodiment, a CAN may be a network inside vehicle 600 used to aid in control of various features and functionality of vehicle 600, such as actuation of brakes, acceleration, braking, steering, windshield wipers, etc. In at least one embodiment, bus 602 may be configured to have dozens or even hundreds of nodes, each with its own unique identifier (e.g., a CAN ID). In at least one embodiment, bus 602 may be read to find steering wheel angle, ground speed, engine revolutions per minute ("RPMs"), button positions, and/or other vehicle status indicators. In at least one embodiment, bus 602 may be a CAN bus that is ASIL B compliant.

In at least one embodiment, in addition to, or alternatively from CAN, FlexRay and/or Ethernet protocols may be used. In at least one embodiment, there may be any number of busses forming bus 602, which may include, without limitation, zero or more CAN busses, zero or more FlexRay busses, zero or more Ethernet busses, and/or zero or more other types of busses using different protocols. In at least one embodiment, two or more busses may be used to perform different functions, and/or may be used for redundancy. For example, a first bus may be used for collision avoidance functionality and a second bus may be used for actuation control. In at least one embodiment, each bus of bus 602 may communicate with any of components of vehicle 600, and two or more busses of bus 602 may communicate with corresponding components. In at least one embodiment, each of any number of system(s) on chip(s) ("SoC(s)") 604 (such as SoC 604(A) and SoC 604(B), each of controller(s) 636, and/or each computer within vehicle may have access to same input data (e.g., inputs from sensors of vehicle 600), and may be connected to a common bus, such CAN bus.

In at least one embodiment, vehicle 600 may include one or more controller(s) 636, such as those described herein with respect to FIG. 6A. In at least one embodiment, controller(s) 636 may be used for a variety of functions. In at least one embodiment, controller(s) 636 may be coupled to any of various other components and systems of vehicle 600, and may be used for control of vehicle 600, artificial intelligence of vehicle 600, infotainment for vehicle 600, and/or other functions.

In at least one embodiment, vehicle 600 may include any number of SoCs 604. In at least one embodiment, each of SoCs 604 may include, without limitation, central processing units ("CPU(s)") 606, graphics processing units ("GPU(s)") 608, processor(s) 610, cache(s) 612, accelerator(s) 614, data store(s) 616, and/or other components and features not illustrated. In at least one embodiment, SoC(s) 604 may be used to control vehicle 600 in a variety of platforms and systems. For example, in at least one embodiment, SoC(s) 604 may be combined in a system (e.g., system of vehicle 600) with a High Definition ("HD") map 622 which may obtain map refreshes and/or updates via network interface 624 from one or more servers (not shown in FIG. 6C).

In at least one embodiment, CPU(s) 606 may include a CPU cluster or CPU complex (alternatively referred to herein as a "CCPLEX"). In at least one embodiment, CPU(s) 606 may include multiple cores and/or level two ("L2") caches. For instance, in at least one embodiment, CPU(s) 606 may include eight cores in a coherent multi-processor configuration. In at least one embodiment, CPU(s) 606 may include four dual-core clusters where each cluster has a dedicated L2 cache (e.g., a 2 megabyte (MB) L2 cache). In at least one embodiment, CPU(s) 606 (e.g., CCPLEX) may be configured to support simultaneous cluster operations enabling any combination of clusters of CPU(s) 606 to be active at any given time.

In at least one embodiment, one or more of CPU(s) 606 may implement power management capabilities that include, without limitation, one or more of following features: individual hardware blocks may be clock-gated automatically when idle to save dynamic power; each core clock may be gated when such core is not actively executing instructions due to execution of Wait for Interrupt ("WFI")/

Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 606 may further implement an enhanced algorithm for managing power states, where allowed power states and expected wakeup times are specified, and hardware/microcode determines which best power state to enter for core, cluster, and CCPLEX. In at least one embodiment, processing cores may support simplified power state entry sequences in software with work offloaded to microcode.

In at least one embodiment, GPU(s) 608 may include an integrated GPU (alternatively referred to herein as an "iGPU"). In at least one embodiment, GPU(s) 608 may be programmable and may be efficient for parallel workloads. In at least one embodiment, GPU(s) 608 may use an enhanced tensor instruction set. In at least one embodiment, GPU(s) 608 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). In at least one embodiment, GPU(s) 608 may include at least eight streaming microprocessors. In at least one embodiment, GPU(s) 608 may use compute application programming interface(s) (API(s)). In at least one embodiment, GPU(s) 608 may use one or more parallel computing platforms and/or programming models (e.g., NVIDIA's CUDA model).

In at least one embodiment, one or more of GPU(s) 608 may be power-optimized for best performance in automotive and embedded use cases. For example, in at least one embodiment, GPU(s) 608 could be fabricated on Fin field-effect transistor ("FinFET") circuitry. In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA Tensor cores for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 608 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 608 may include unified memory technology. In at least one embodiment, address translation services ("ATS") support may be used to allow GPU(s) 608 to access CPU(s) 606 page tables directly. In at least one embodiment, embodiment, when a GPU of GPU(s) 608 memory management unit ("MMU") experiences a miss, an address translation request may be transmitted to CPU(s) 606. In response, 2 CPU of CPU(s) 606 may look in its page tables for a virtual-to-physical mapping for an address and transmit translation back to GPU(s) 608, in at least one embodiment. In at least one embodiment, unified memory technology may allow a single unified virtual address space for memory of both CPU(s) 606 and GPU(s) 608, thereby simplifying GPU(s) 608 programming and porting of applications to GPU(s) 608.

In at least one embodiment, GPU(s) 608 may include any number of access counters that may keep track of frequency of access of GPU(s) 608 to memory of other processors. In at least one embodiment, access counter(s) may help ensure that memory pages are moved to physical memory of a processor that is accessing pages most frequently, thereby improving efficiency for memory ranges shared between processors.

In at least one embodiment, one or more of SoC(s) 604 may include any number of cache(s) 612, including those described herein. For example, in at least one embodiment, cache(s) 612 could include a level three ("L3") cache that is available to both CPU(s) 606 and GPU(s) 608 (e.g., that is connected to CPU(s) 606 and GPU(s) 408). In at least one embodiment, cache(s) 612 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, one or more of SoC(s) 604 may include one or more accelerator(s) 614 (e.g., hardware accelerators, software accelerators, or a combination thereof). In at least one embodiment, SoC(s) 604 may include a hardware acceleration cluster that may include optimized hardware accelerators and/or large on-chip memory. In at least one embodiment, large on-chip memory (e.g., 4 MB of SRAM), may enable a hardware acceleration cluster to accelerate neural networks and other calculations. In at least one embodiment, a hardware acceleration cluster may be used to complement GPU(s) 608 and to off-load some of tasks of GPU(s) 608 (e.g., to free up more cycles of GPU(s) 608 for performing other tasks). In at least one embodiment, accelerator(s) 614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 614 (e.g., hardware acceleration cluster) may include one or more deep learning accelerator ("DLA"). In at least one embodiment, DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). In at least one embodiment, DLA(s) may further be optimized for a specific set of neural network types and floating point operations, as well as inferencing. In at least one embodiment, design of DLA(s)

may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

In at least one embodiment, DLA(s) may perform any function of GPU(s) 608, and by using an inference accelerator, for example, a designer may target either DLA(s) or GPU(s) 608 for any function. For example, in at least one embodiment, a designer may focus processing of CNNs and floating point operations on DLA(s) and leave other functions to GPU(s) 608 and/or accelerator(s) 614.

In at least one embodiment, accelerator(s) 614 may include programmable vision accelerator ("PVA"), which may alternatively be referred to herein as a computer vision accelerator. In at least one embodiment, PVA may be designed and configured to accelerate computer vision algorithms for advanced driver assistance system ("ADAS") 638, autonomous driving, augmented reality ("AR") applications, and/or virtual reality ("VR") applications. In at least one embodiment, PVA may provide a balance between performance and flexibility. For example, in at least one embodiment, each PVA may include, for example and without limitation, any number of reduced instruction set computer ("RISC") cores, direct memory access ("DMA"), and/or any number of vector processors.

In at least one embodiment, RISC cores may interact with image sensors (e.g., image sensors of any cameras described herein), image signal processor(s), etc. In at least one embodiment, each RISC core may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA to access system memory independently of CPU(s) 606. In at least one embodiment, DMA may support any number of features used to provide optimization to a PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, a PVA may include a PVA core and two vector processing subsystem partitions. In at least one embodiment, a PVA core may include a processor subsystem, DMA engine(s) (e.g., two DMA engines), and/or other peripherals. In at least one embodiment, a vector processing subsystem may operate as a primary processing engine of a PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute a common computer vision algorithm, but on different regions of an image. In at least one embodiment, vector processors included in a particular PVA may simultaneously execute different computer vision algorithms, on one image, or even execute different algorithms on sequential images or portions of an image. In at least one embodiment, among other things, any number of PVAs may be included in hardware acceleration cluster and any number of vector processors may be included in each PVA. In at least one embodiment, PVA may include additional error correcting code ("ECC") memory, to enhance overall system safety.

In at least one embodiment, accelerator(s) 614 may include a computer vision network on-chip and static random-access memory ("SRAM"), for providing a high-bandwidth, low latency SRAM for accelerator(s) 614. In at least one embodiment, on-chip memory may include at least 4 MB SRAM, comprising, for example and without limitation, eight field-configurable memory blocks, that may be accessible by both a PVA and a DLA. In at least one embodiment, each pair of memory blocks may include an advanced peripheral bus ("APB") interface, configuration circuitry, a controller, and a multiplexer. In at least one embodiment, any type of memory may be used. In at least one embodiment, a PVA and a DLA may access memory via a backbone that provides a PVA and a DLA with high-speed access to memory. In at least one embodiment, a backbone may include a computer vision network on-chip that interconnects a PVA and a DLA to memory (e.g., using APB).

In at least one embodiment, a computer vision network on-chip may include an interface that determines, before transmission of any control signal/address/data, that both a PVA and a DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 614 can have a wide array of uses for autonomous driving. In at least one embodiment, a PVA may be used for key processing stages in ADAS and autonomous vehicles. In at least one embodiment, a PVA's capabilities are a good match for algorithmic domains needing predictable processing, at low power and low latency. In other words, a PVA performs well on semi-dense or dense regular computation, even on small data sets, which might require predictable run-times with low latency and low power. In at least one embodiment, such as in vehicle 600, PVAs might be designed to run classic computer vision algorithms, as they can be efficient at object detection and operating on integer math.

For example, according to at least one embodiment of technology, a PVA is used to perform computer stereo vision. In at least one embodiment, a semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, a PVA may perform computer stereo vision functions on inputs from two monocular cameras.

In at least one embodiment, a PVA may be used to perform dense optical flow. For example, in at least one embodiment, a PVA could process raw RADAR data (e.g., using a 6D Fast Fourier Transform) to provide processed RADAR data. In at least one embodiment, a PVA is used for time of flight depth processing, by processing raw time of flight data to provide processed time of flight data, for example.

In at least one embodiment, a DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, a confidence measure enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for ΔEB. In at least one embodiment, a DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 666 that correlates with vehicle 600 orientation, distance, 3D location estimates of object obtained from neural network and/or other sensors (e.g., LIDAR sensor(s) 664 or RADAR sensor(s) 460), among others.

In at least one embodiment, one or more of SoC(s) 604 may include data store(s) 616 (e.g., memory). In at least one embodiment, data store(s) 616 may be on-chip memory of SoC(s) 604, which may store neural networks to be executed on GPU(s) 608 and/or a DLA. In at least one embodiment, data store(s) 616 may be large enough in capacity to store multiple instances of neural networks for redundancy and safety. In at least one embodiment, data store(s) 616 may comprise L2 or L3 cache(s).

In at least one embodiment, one or more of SoC(s) 604 may include any number of processor(s) 610 (e.g., embedded processors). In at least one embodiment, processor(s) 610 may include a boot and power management processor that may be a dedicated processor and subsystem to handle boot power and management functions and related security enforcement. In at least one embodiment, a boot and power management processor may be a part of a boot sequence of SoC(s) 604 and may provide runtime power management services. In at least one embodiment, a boot power and management processor may provide clock and voltage programming, assistance in system low power state transitions, management of SoC(s) 604 thermals and temperature sensors, and/or management of SoC(s) 604 power states. In at least one embodiment, each temperature sensor may be implemented as a ring-oscillator whose output frequency is proportional to temperature, and SoC(s) 604 may use ring-oscillators to detect temperatures of CPU(s) 606, GPU(s) 608, and/or accelerator(s) 614. In at least one embodiment, if temperatures are determined to exceed a threshold, then a boot and power management processor may enter a temperature fault routine and put SoC(s) 604 into a lower power state and/or put vehicle 600 into a chauffeur to safe stop mode (e.g., bring vehicle 600 to a safe stop).

In at least one embodiment, processor(s) 610 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 610 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 610 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 610 may further include a real-time camera engine that may include, without limitation, a dedicated processor subsystem for handling real-time camera management. In at least one embodiment, processor (s) 610 may further include a high-dynamic range signal processor that may include, without limitation, an image signal processor that is a hardware engine that is part of a camera processing pipeline.

In at least one embodiment, processor(s) 610 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s) 670, surround camera(s) 674, and/or on in-cabin monitoring camera sensor(s). In at least one embodiment, in-cabin monitoring camera sensor(s) are preferably monitored by a neural network running on another instance of SoC 604, configured to identify in cabin events and respond accordingly. In at least one embodiment, an in-cabin system may perform, without limitation, lip reading to activate cellular service and place a phone call, dictate emails, change a vehicle's destination, activate or change a vehicle's infotainment system and settings, or provide voice-activated web surfing. In at least one embodiment, certain functions are available to a driver when a vehicle is operating in an autonomous mode and are disabled otherwise.

In at least one embodiment, a video image compositor may include enhanced temporal noise reduction for both spatial and temporal noise reduction. For example, in at least one embodiment, where motion occurs in a video, noise reduction weights spatial information appropriately, decreasing weights of information provided by adjacent frames. In at least one embodiment, where an image or portion of an image does not include motion, temporal noise reduction performed by video image compositor may use information from a previous image to reduce noise in a current image.

In at least one embodiment, a video image compositor may also be configured to perform stereo rectification on input stereo lens frames. In at least one embodiment, a video image compositor may further be used for user interface composition when an operating system desktop is in use, and GPU(s) 608 are not required to continuously render new surfaces. In at least one embodiment, when GPU(s) 608 are powered on and active doing 3D rendering, a video image compositor may be used to offload GPU(s) 608 to improve performance and responsiveness.

In at least one embodiment, one or more SoC of SoC(s) 604 may further include a mobile industry processor interface ("MIPI") camera serial interface for receiving video and input from cameras, a high-speed interface, and/or a video input block that may be used for a camera and related pixel input functions. In at least one embodiment, one or more of SoC(s) 604 may further include an input/output controller(s) that may be controlled by software and may be used for receiving I/O signals that are uncommitted to a specific role.

In at least one embodiment, one or more Soc of SoC(s) 604 may further include a broad range of peripheral interfaces to enable communication with peripherals, audio encoders/decoders ("codecs"), power management, and/or other devices. In at least one embodiment, SoC(s) 604 may be used to process data from cameras (e.g., connected over Gigabit Multimedia Serial Link and Ethernet channels), sensors (e.g., LIDAR sensor(s) 664, RADAR sensor(s) 660, etc. that may be connected over Ethernet channels), data from bus 602 (e.g., speed of vehicle 600, steering wheel position, etc.), data from GNSS sensor(s) 658 (e.g., connected over a Ethernet bus or a CAN bus), etc. In at least one embodiment, one or more SoC of SoC(s) 604 may further include dedicated high-performance mass storage controllers that may include their own DMA engines, and that may be used to free CPU(s) 606 from routine data management tasks.

In at least one embodiment, SoC(s) 604 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. In at least one embodiment, SoC(s) 604 may be faster, more reliable, and even more energy-efficient and space-efficient than conventional systems. For example, in at least one embodiment, accelerator(s) 614, when combined with CPU(s) 606, GPU(s) 608, and data store(s) 616, may provide for a fast, efficient platform for Level 3-5 autonomous vehicles.

In at least one embodiment, computer vision algorithms may be executed on CPUs, which may be configured using a high-level programming language, such as C, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on a DLA or a discrete GPU (e.g., GPU(s) 420) may include text and word recognition, allowing reading and understanding of traffic signs, including signs for which a neural network has not been specifically trained. In at least one embodiment, a DLA may further include a neural network that is able to identify, interpret, and provide semantic understanding of a sign, and to pass that semantic understanding to path planning modules running on a CPU Complex.

In at least one embodiment, multiple neural networks may be run simultaneously, as for Level 3, 4, or 5 driving. For example, in at least one embodiment, a warning sign stating "Caution: flashing lights indicate icy conditions," along with an electric light, may be independently or collectively interpreted by several neural networks. In at least one embodiment, such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights are detected, icy conditions exist. In at least one embodiment, a flashing light may be identified by operating a third deployed neural network over multiple frames, informing a vehicle's path-planning software of a presence (or an absence) of flashing lights. In at least one embodiment, all three neural networks may run simultaneously, such as within a DLA and/or on GPU(s) 608.

In at least one embodiment, a CNN for facial recognition and vehicle owner identification may use data from camera sensors to identify presence of an authorized driver and/or owner of vehicle 600. In at least one embodiment, an always-on sensor processing engine may be used to unlock a vehicle when an owner approaches a driver door and turns on lights, and, in a security mode, to disable such vehicle when an owner leaves such vehicle. In this way, SoC(s) 604 provide for security against theft and/or carjacking.

In at least one embodiment, a CNN for emergency vehicle detection and identification may use data from microphones 696 to detect and identify emergency vehicle sirens. In at least one embodiment, SoC(s) 604 use a CNN for classifying environmental and urban sounds, as well as classifying visual data. In at least one embodiment, a CNN running on a DLA is trained to identify a relative closing speed of an emergency vehicle (e.g., by using a Doppler effect). In at least one embodiment, a CNN may also be trained to identify emergency vehicles specific to a local area in which a vehicle is operating, as identified by GNSS sensor(s) 658. In at least one embodiment, when operating in Europe, a CNN will seek to detect European sirens, and when in North America, a CNN will seek to identify only North American sirens. In at least one embodiment, once an emergency vehicle is detected, a control program may be used to execute an emergency vehicle safety routine, slowing a vehicle, pulling over to a side of a road, parking a vehicle, and/or idling a vehicle, with assistance of ultrasonic sensor (s) 662, until emergency vehicles pass.

In at least one embodiment, vehicle 600 may include CPU(s) 618 (e.g., discrete CPU(s), or dCPU(s)), that may be coupled to SoC(s) 604 via a high-speed interconnect (e.g., PCIe). In at least one embodiment, CPU(s) 618 may include an X86 processor, for example. CPU(s) 618 may be used to perform any of a variety of functions, including arbitrating potentially inconsistent results between ADAS sensors and SoC(s) 604, and/or monitoring status and health of controller(s) 636 and/or an infotainment system on a chip ("infotainment SoC") 630, for example.

In at least one embodiment, vehicle 600 may include GPU(s) 620 (e.g., discrete GPU(s), or dGPU(s)), that may be coupled to SoC(s) 604 via a high-speed interconnect (e.g., NVIDIA's NVLINK channel). In at least one embodiment, GPU(s) 620 may provide additional artificial intelligence functionality, such as by executing redundant and/or different neural networks and may be used to train and/or update neural networks based at least in part on input (e.g., sensor data) from sensors of a vehicle 600.

In at least one embodiment, vehicle 600 may further include network interface 624 which may include, without limitation, wireless antenna(s) 626 (e.g., one or more wireless antennas for different communication protocols, such as a cellular antenna, a Bluetooth antenna, etc.). In at least one embodiment, network interface 624 may be used to enable wireless connectivity to Internet cloud services (e.g., with server(s) and/or other network devices), with other vehicles, and/or with computing devices (e.g., client devices of passengers). In at least one embodiment, to communicate with other vehicles, a direct link may be established between vehicle 40 and another vehicle and/or an indirect link may be established (e.g., across networks and over the Internet). In at least one embodiment, direct links may be provided using a vehicle-to-vehicle communication link. In at least one embodiment, a vehicle-to-vehicle communication link may provide vehicle 600 information about vehicles in proximity to vehicle 600 (e.g., vehicles in front of, on a side of, and/or behind vehicle 600). In at least one embodiment, such aforementioned functionality may be part of a cooperative adaptive cruise control functionality of vehicle 600.

In at least one embodiment, network interface 624 may include an SoC that provides modulation and demodulation functionality and enables controller(s) 636 to communicate over wireless networks. In at least one embodiment, network interface 624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 600 may further include data store(s) 628 which may include, without limitation, off-chip (e.g., off SoC(s) 404) storage. In at least one embodiment, data store(s) 628 may include, without limitation, one or more storage elements including RAM, SRAM, dynamic random-access memory ("DRAM"), video random-access memory ("VRAM"), flash memory, hard disks, and/or other components and/or devices that may store at least one bit of data.

In at least one embodiment, vehicle 600 may further include GNSS sensor(s) 658 (e.g., GPS and/or assisted GPS sensors), to assist in mapping, perception, occupancy grid generation, and/or path planning functions. In at least one embodiment, any number of GNSS sensor(s) 658 may be used, including, for example and without limitation, a GPS using a USB connector with an Ethernet-to-Serial (e.g., RS-232) bridge.

In at least one embodiment, vehicle 600 may further include RADAR sensor(s) 660. In at least one embodiment, RADAR sensor(s) 660 may be used by vehicle 600 for long-range vehicle detection, even in darkness and/or severe weather conditions. In at least one embodiment, RADAR functional safety levels may be ASIL B. In at least one embodiment, RADAR sensor(s) 660 may use a CAN bus and/or bus 602 (e.g., to transmit data generated by RADAR sensor(s) 460) for control and to access object tracking data, with access to Ethernet channels to access raw data in some examples. In at least one embodiment, a wide variety of RADAR sensor types may be used. For example, and without limitation, RADAR sensor(s) 660 may be suitable for front, rear, and side RADAR use. In at least one embodiment, one or more sensor of RADAR sensors(s) 660 is a Pulse Doppler RADAR sensor.

In at least one embodiment, RADAR sensor(s) 660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m (meter) range. In at least one embodiment, RADAR sensor(s) 660 may help in distinguishing between static and moving objects and may be used by ADAS system 638 for emergency brake assist and forward collision warning. In at least one embodiment, sensors 460(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, a central four antennae may create a focused beam pattern, designed to record vehicle's 600 surroundings at higher speeds with minimal interference from traffic in adjacent lanes. In at least one embodiment, another two antennae may expand field of view, making it possible to quickly detect vehicles entering or leaving a lane of vehicle 600.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 660 designed to be installed at both ends of a rear bumper. When installed at both ends of a rear bumper, in at least one embodiment, a RADAR sensor system may create two beams that constantly monitor blind spots in a rear direction and next to a vehicle. In at least one embodiment, short-range RADAR systems may be used in ADAS system 638 for blind spot detection and/or lane change assist.

In at least one embodiment, vehicle 600 may further include ultrasonic sensor(s) 662. In at least one embodiment, ultrasonic sensor(s) 662, which may be positioned at a front, a back, and/or side location of vehicle 600, may be used for parking assist and/or to create and update an occupancy grid. In at least one embodiment, a wide variety of ultrasonic sensor(s) 662 may be used, and different ultrasonic sensor(s) 662 may be used for different ranges of detection (e.g., 2.5 m, 4 m). In at least one embodiment, ultrasonic sensor(s) 662 may operate at functional safety levels of ASIL B.

In at least one embodiment, vehicle 600 may include LIDAR sensor(s) 664. In at least one embodiment, LIDAR sensor(s) 664 may be used for object and pedestrian detection, emergency braking, collision avoidance, and/or other functions. In at least one embodiment, LIDAR sensor(s) 664 may operate at functional safety level ASIL B. In at least one embodiment, vehicle 600 may include multiple LIDAR sensors 664 (e.g., two, four, six, etc.) that may use an Ethernet channel (e.g., to provide data to a Gigabit Ethernet switch).

In at least one embodiment, LIDAR sensor(s) 664 may be capable of providing a list of objects and their distances for a 360-degree field of view. In at least one embodiment, commercially available LIDAR sensor(s) 664 may have an advertised range of approximately 100 m, with an accuracy of 2 cm to 3 cm, and with support for a 100 Mbps Ethernet connection, for example. In at least one embodiment, one or more non-protruding LIDAR sensors may be used. In such an embodiment, LIDAR sensor(s) 664 may include a small device that may be embedded into a front, a rear, a side, and/or a corner location of vehicle 600. In at least one embodiment, LIDAR sensor(s) 664, in such an embodiment, may provide up to a 120-degree horizontal and 35-degree vertical field-of-view, with a 200 m range even for low-reflectivity objects. In at least one embodiment, front-mounted LIDAR sensor(s) 664 may be configured for a horizontal field of view between 45 degrees and 135 degrees.

In at least one embodiment, LIDAR technologies, such as 3D flash LIDAR, may also be used. In at least one embodiment, 3D flash LIDAR uses a flash of a laser as a transmission source, to illuminate surroundings of vehicle 600 up to approximately 200 m. In at least one embodiment, a flash LIDAR unit includes, without limitation, a receptor, which records laser pulse transit time and reflected light on each pixel, which in turn corresponds to a range from vehicle 600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light as a 3D range point cloud and co-registered intensity data.

In at least one embodiment, vehicle 600 may further include IMU sensor(s) 666. In at least one embodiment, IMU sensor(s) 666 may be located at a center of a rear axle of vehicle 600. In at least one embodiment, IMU sensor(s) 666 may include, for example and without limitation, accelerometer(s), magnetometer(s), gyroscope(s), a magnetic compass, magnetic compasses, and/or other sensor types. In at least one embodiment, such as in six-axis applications, IMU sensor(s) 666 may include, without limitation, accelerometers and gyroscopes. In at least one embodiment, such as in nine-axis applications, IMU sensor(s) 666 may include, without limitation, accelerometers, gyroscopes, and magnetometers.

In at least one embodiment, IMU sensor(s) 666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 666 may enable vehicle 600 to estimate its heading without requiring input from a magnetic sensor by directly observing and correlating changes in velocity from a GPS to IMU sensor(s) 666. In at least one embodiment, IMU sensor(s) 666 and GNSS sensor(s) 658 may be combined in a single integrated unit.

In at least one embodiment, vehicle 600 may include microphone(s) 696 placed in and/or around vehicle 600. In at least one embodiment, microphone(s) 696 may be used for emergency vehicle detection and identification, among other things.

In at least one embodiment, vehicle 600 may further include any number of camera types, including stereo camera(s) 668, wide-view camera(s) 670, infrared camera(s) 672, surround camera(s) 674, long-range camera(s) 698, mid-range camera(s) 676, and/or other camera types. In at least one embodiment, cameras may be used to capture image data around an entire periphery of vehicle 600. In at least one embodiment, which types of cameras used depends on vehicle 600. In at least one embodiment, any combination of camera types may be used to provide necessary coverage around vehicle 600. In at least one embodiment, a number of cameras deployed may differ depending on embodiment. For example, in at least one embodiment, vehicle 600 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet communications. In at least one embodiment, each camera might be as described with more detail previously herein with respect to FIG. 6A and FIG. 6B.

In at least one embodiment, vehicle 600 may further include vibration sensor(s) 642. In at least one embodiment, vibration sensor(s) 642 may measure vibrations of components of vehicle 600, such as axle(s). For example, in at least one embodiment, changes in vibrations may indicate a change in road surfaces. In at least one embodiment, when two or more vibration sensors 642 are used, differences between vibrations may be used to determine friction or slippage of road surface (e.g., when a difference in vibration is between a power-driven axle and a freely rotating axle).

In at least one embodiment, vehicle 600 may include ADAS system 638. In at least one embodiment, ADAS system 638 may include, without limitation, an SoC, in some examples. In at least one embodiment, ADAS system 638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 660, LIDAR sensor(s) 664, and/or any number of camera(s). In at least one embodiment, ACC system may include a longitudinal ACC system and/or a lateral ACC system. In at least one embodiment, a longitudinal ACC system monitors and controls distance to another vehicle immediately ahead of vehicle 600 and automatically adjusts speed of vehicle 600 to maintain a safe distance from vehicles ahead. In at least one embodiment, a lateral ACC system performs distance keeping, and advises vehicle 600 to change lanes when necessary. In at least one embodiment, a lateral ACC is related to other ADAS applications, such as LC and CW.

In at least one embodiment, a CACC system uses information from other vehicles that may be received via network interface 624 and/or wireless antenna(s) 626 from other vehicles via a wireless link, or indirectly, over a network connection (e.g., over the Internet). In at least one embodiment, direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 600), while I2V communication provides information about traffic further ahead. In at least one embodiment, a CACC system may include either or both I2V and V2V information sources. In at least one embodiment, given information of vehicles ahead of vehicle 600, a CACC system may be more reliable, and it has potential to improve traffic flow smoothness and reduce congestion on road.

In at least one embodiment, an FCW system is designed to alert a driver to a hazard, so that such driver may take corrective action. In at least one embodiment, an FCW system uses a front-facing camera and/or RADAR sensor(s) 660, coupled to a dedicated processor, DSP, FPGA, and/or ASIC, that is electrically coupled to provide driver feedback, such as a display, speaker, and/or vibrating component. In at least one embodiment, an FCW system may provide a warning, such as in form of a sound, visual warning, vibration and/or a quick brake pulse.

In at least one embodiment, an AEB system detects an impending forward collision with another vehicle or other object and may automatically apply brakes if a driver does not take corrective action within a specified time or distance parameter. In at least one embodiment, AEB system may use front-facing camera(s) and/or RADAR sensor(s) 660, coupled to a dedicated processor, DSP, FPGA, and/or ASIC. In at least one embodiment, when an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. In at least one embodiment, an AEB system may include techniques such as dynamic brake support and/or crash imminent braking.

In at least one embodiment, an LDW system provides visual, audible, and/or tactile warnings, such as steering wheel or seat vibrations, to alert driver when vehicle 600 crosses lane markings. In at least one embodiment, an LDW system does not activate when a driver indicates an intentional lane departure, such as by activating a turn signal. In at least one embodiment, an LDW system may use front-side facing cameras, coupled to a dedicated processor, DSP, FPGA, and/or ASIC, that is electrically coupled to provide driver feedback, such as a display, speaker, and/or vibrating component. In at least one embodiment, an LKA system is a variation of an LDW system. In at least one embodiment, an LKA system provides steering input or braking to correct vehicle 600 if vehicle 600 starts to exit its lane.

In at least one embodiment, a BSW system detects and warns a driver of vehicles in an automobile's blind spot. In at least one embodiment, a BSW system may provide a visual, audible, and/or tactile alert to indicate that merging or changing lanes is unsafe. In at least one embodiment, a BSW system may provide an additional warning when a driver uses a turn signal. In at least one embodiment, a BSW system may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

In at least one embodiment, an RCTW system may provide visual, audible, and/or tactile notification when an object is detected outside a rear-camera range when vehicle 600 is backing up. In at least one embodiment, an RCTW system includes an AEB system to ensure that vehicle brakes are applied to avoid a crash. In at least one embodiment, an RCTW system may use one or more rear-facing RADAR sensor(s) 660, coupled to a dedicated processor, DSP, FPGA, and/or ASIC, that is electrically coupled to provide driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert a driver and allow that driver to decide whether a safety condition truly exists and act accordingly. In at least one embodiment, vehicle 600 itself decides, in case of conflicting results, whether to heed result from a primary computer or a secondary computer (e.g., a first controller or a second controller of controllers 436). For example, in at least one embodiment, ADAS system 638 may be a backup and/or secondary computer for providing perception information to a backup computer rationality module. In at least one embodiment, a backup computer rationality monitor may run redundant diverse software on hardware components to detect faults in perception and dynamic driving tasks. In at least one embodiment, outputs from ADAS system 638 may be provided to a supervisory MCU. In at least one embodiment, if outputs from a primary computer and outputs from a secondary computer conflict, a supervisory MCU determines how to reconcile conflict to ensure safe operation.

In at least one embodiment, a primary computer may be configured to provide a supervisory MCU with a confidence score, indicating that primary computer's confidence in a chosen result. In at least one embodiment, if that confidence score exceeds a threshold, that supervisory MCU may follow that primary computer's direction, regardless of whether that secondary computer provides a conflicting or inconsistent result. In at least one embodiment, where a confidence score does not meet a threshold, and where primary and secondary computers indicate different results (e.g., a conflict), a supervisory MCU may arbitrate between computers to determine an appropriate outcome.

In at least one embodiment, a supervisory MCU may be configured to run a neural network(s) that is trained and configured to determine, based at least in part on outputs from a primary computer and outputs from a secondary computer, conditions under which that secondary computer provides false alarms. In at least one embodiment, neural network(s) in a supervisory MCU may learn when a secondary computer's output may be trusted, and when it cannot. For example, in at least one embodiment, when that secondary computer is a RADAR-based FCW system, a neural network(s) in that supervisory MCU may learn when an FCW system is identifying metallic objects that are not, in fact, hazards, such as a drainage grate or manhole cover that triggers an alarm. In at least one embodiment, when a secondary computer is a camera-based LDW system, a neural network in a supervisory MCU may learn to override LDW when bicyclists or pedestrians are present and a lane departure is, in fact, a safest maneuver. In at least one embodiment, a supervisory MCU may include at least one of a DLA or a GPU suitable for running neural network(s) with associated memory. In at least one embodiment, a supervisory MCU may comprise and/or be included as a component of SoC(s) 604.

In at least one embodiment, ADAS system 638 may include a secondary computer that performs ADAS functionality using traditional rules of computer vision. In at least one embodiment, that secondary computer may use classic computer vision rules (if-then), and presence of a neural network(s) in a supervisory MCU may improve reliability, safety and performance. For example, in at least one embodiment, diverse implementation and intentional non-identity makes an overall system more fault-tolerant, especially to faults caused by software (or software-hardware interface) functionality. For example, in at least one embodiment, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

In at least one embodiment, an output of ADAS system 638 may be fed into a primary computer's perception block and/or a primary computer's dynamic driving task block. For example, in at least one embodiment, if ADAS system 638 indicates a forward crash warning due to an object immediately ahead, a perception block may use this information when identifying objects. In at least one embodiment, a secondary computer may have its own neural network that is trained and thus reduces a risk of false positives, as described herein.

In at least one embodiment, vehicle 600 may further include infotainment SoC 630 (e.g., an in-vehicle infotainment system (IVI)). Although illustrated and described as an SoC, infotainment system SoC 630, in at least one embodiment, may not be an SoC, and may include, without limitation, two or more discrete components. In at least one embodiment, infotainment SoC 630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 600. For example, infotainment SoC 630 could include radios, disk players, navigation systems, video players, USB and Bluetooth connectivity, carputers, in-car entertainment, WiFi, steering wheel audio controls, hands free voice control, a heads-up display ("HUD"), HMI display 634, a telematics device, a control panel (e.g., for controlling and/or interacting with various components, features, and/or systems), and/or other components. In at least one embodiment, infotainment SoC 630 may further be used to provide information (e.g., visual and/or audible) to user(s) of vehicle 600, such as information from ADAS system 638, autonomous driving information such as planned vehicle maneuvers, trajectories, surrounding environment information (e.g., intersection information, vehicle information, road information, etc.), and/or other information.

In at least one embodiment, infotainment SoC 630 may include any amount and type of GPU functionality. In at least one embodiment, infotainment SoC 630 may communicate over bus 602 with other devices, systems, and/or components of vehicle 600. In at least one embodiment, infotainment SoC 630 may be coupled to a supervisory MCU such that a GPU of an infotainment system may perform some self-driving functions in event that primary controller(s) 636 (e.g., primary and/or backup computers of vehicle 600) fail. In at least one embodiment, infotainment SoC 630 may put vehicle 600 into a chauffeur to safe stop mode, as described herein.

In at least one embodiment, vehicle 600 may further include instrument cluster 632 (e.g., a digital dash, an electronic instrument cluster, a digital instrument panel, etc.). In at least one embodiment, instrument cluster 632 may include, without limitation, a controller and/or supercomputer (e.g., a discrete controller or supercomputer). In at least one embodiment, instrument cluster 632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 630 and instrument cluster 632. In at least one embodiment, instrument cluster 632 may be included as part of infotainment SoC 630, or vice versa.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the autonomous vehicle 600 of FIG. 6C for performing image processing operations, including CCM calibration operations.

Figure 6D:
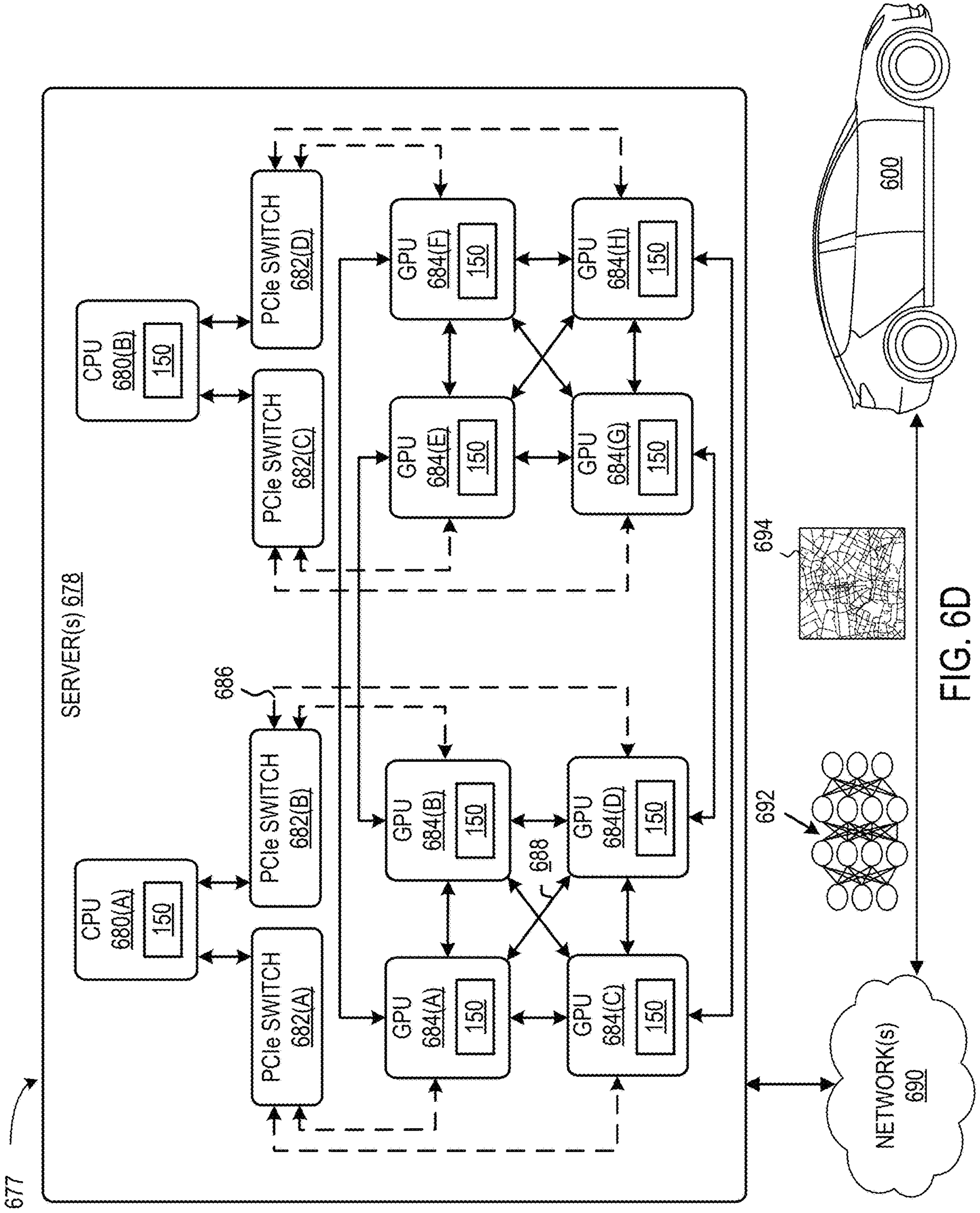
FIG. 6D is a diagram illustrating a system for communication between cloud-based server(s) and the autonomous vehicle of FIG. 6A, according to at least one embodiment.

FIG. 6D is a diagram of a system 677 for communication between cloud-based server(s) and autonomous vehicle 600 of FIG. 6A, according to at least one embodiment. In at least one embodiment, system 677 may include, without limitation, server(s) 678, network(s) 690, and any number and type of vehicles, including vehicle 600. In at least one embodiment, server(s) 678 may include, without limitation, a plurality of GPUs 484(A)-484(H) (collectively referred to herein as GPUs 484), PCIe switches 482(A)-482(D) (collectively referred to herein as PCIe switches 482), and/or CPUs 480(A)-480(B) (collectively referred to herein as CPUs 480). In at least one embodiment, GPUs 684, CPUs 680, and PCIe switches 682 may be interconnected with high-speed interconnects such as, for example and without limitation, NVLink interfaces 688 developed by NVIDIA and/or PCIe connections 686. In at least one embodiment, GPUs 684 are connected via an NVLink and/or NVSwitch SoC and GPUs 684 and PCIe switches 682 are connected via PCIe interconnects. Although eight GPUs 684, two CPUs 680, and four PCIe switches 682 are illustrated, this is not intended to be limiting. In at least one embodiment, each of server(s) 678 may include, without limitation, any number of GPUs 684, CPUs 680, and/or PCIe switches 682, in any combination. For example, in at least one embodiment, server(s) 678 could each include eight, sixteen, thirty-two, and/or more GPUs 684.

In at least one embodiment, server(s) 678 may receive, over network(s) 690 and from vehicles, image data representative of images showing unexpected or changed road conditions, such as recently commenced road-work. In at least one embodiment, server(s) 678 may transmit, over network(s) 690 and to vehicles, neural networks 692, updated or otherwise, and/or map information 694, including, without limitation, information regarding traffic and road conditions. In at least one embodiment, updates to map information 694 may include, without limitation, updates for HD map 622, such as information regarding construction sites, potholes, detours, flooding, and/or other obstructions. In at least one embodiment, neural networks 692, and/or map information 694 may have resulted from new training and/or experiences represented in data received from any number of vehicles in an environment, and/or based at least in part on training performed at a data center (e.g., using server(s) 678 and/or other servers).

In at least one embodiment, server(s) 678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 490), and/or machine learning models may be used by server(s) 678 to remotely monitor vehicles.

In at least one embodiment, server(s) 678 may receive data from vehicles and apply data to up-to-date real-time neural networks for real-time intelligent inferencing. In at least one embodiment, server(s) 678 may include deep-learning supercomputers and/or dedicated AI computers powered by GPU(s) 684, such as a DGX and DGX Station machines developed by NVIDIA. However, in at least one embodiment, server(s) 678 may include deep learning infrastructure that uses CPU-powered data centers.

In at least one embodiment, deep-learning infrastructure of server(s) 678 may be capable of fast, real-time inferencing, and may use that capability to evaluate and verify health of processors, software, and/or associated hardware in vehicle 600. For example, in at least one embodiment, deep-learning infrastructure may receive periodic updates from vehicle 600, such as a sequence of images and/or objects that vehicle 600 has located in that sequence of images (e.g., via computer vision and/or other machine learning object classification techniques). In at least one embodiment, deep-learning infrastructure may run its own neural network to identify objects and compare them with objects identified by vehicle 600 and, if results do not match and deep-learning infrastructure concludes that AI in vehicle 600 is malfunctioning, then server(s) 678 may transmit a signal to vehicle 600 instructing a fail-safe computer of vehicle 600 to assume control, notify passengers, and complete a safe parking maneuver.

In at least one embodiment, server(s) 678 may include GPU(s) 684 and one or more programmable inference accelerators (e.g., NVIDIA's TensorRT 3 devices). In at least one embodiment, a combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) implementing processing logic 120 and/or processing logic 150 are used to perform one or more embodiments. Details regarding processing logic 120 and processing logic 150 are provided herein in conjunction with FIG. 1.

Figure 7:
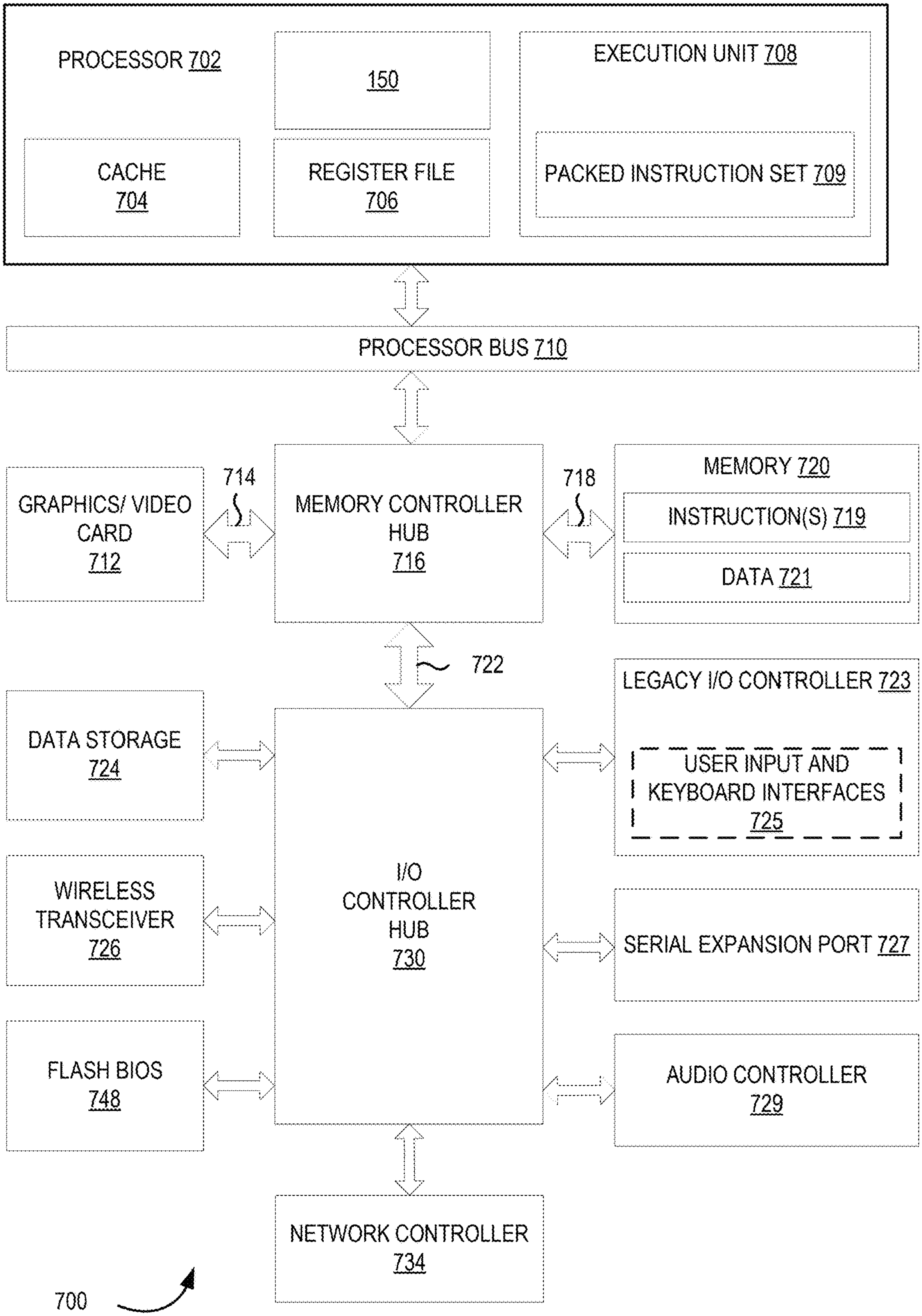
FIG. 7 is a block diagram illustrating a computer system, according to at least one embodiment.

FIG. 7 is a block diagram illustrating an example computer system, which may be a system with interconnected devices and components, a system-on-a-chip (SOC) or some combination thereof formed with a processor that may include execution units to execute an instruction, according to at least one embodiment. In at least one embodiment, a computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 700 may include, without limitation, processor 702 that may include, without limitation, one or more execution units 708 to perform image processing and CCM calibration according to techniques described herein. In at least one embodiment, computer system 700 is a single processor desktop or server system, but in another embodiment, computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, a register file 706 may store different types of data in various registers including, without limitation, integer registers, floating point registers, status registers, and an instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor, along with associated circuitry to execute instructions, operations used by many multimedia applications may be performed using packed data in processor 702. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be a Dynamic Random Access Memory ("DRAM") device, a Static Random Access Memory ("SRAM") device, a flash memory device, or another memory device. In at least one embodiment, memory 720 may store instruction(s) 719 and/or data 721 represented by data signals that may be executed by processor 702.

In at least one embodiment, a system logic chip may be coupled to processor bus 710 and memory 720. In at least one embodiment, a system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O interface 722. In at least one embodiment, a system logic chip may provide a graphics port for coupling to a graphics controller. In at least one embodiment, MCH 716 may be coupled to memory 720 through high bandwidth memory path 718 and a graphics/video card 712 may be coupled to MCH 716 through an Accelerated Graphics Port ("AGP") interconnect 714.

In at least one embodiment, computer system 700 may use system I/O interface 722 as a proprietary hub interface bus to couple MCH 716 to an I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as a Universal Serial Bus ("USB") port, and a network controller 734. In at least one embodiment, data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips", whereas in other embodiments, FIG. 7 may illustrate an example SoC. In at least one embodiment, devices illustrated in FIG. 7 may be interconnected with proprietary interconnects, standardized interconnects (e.g., PCIe) or some combination thereof. In at least one embodiment, one or more components of computer system 700 are interconnected using compute express link (CXL) interconnects.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the system of FIG. 7 for performing image processing operations, including CCM calibration operations.

Figure 8:
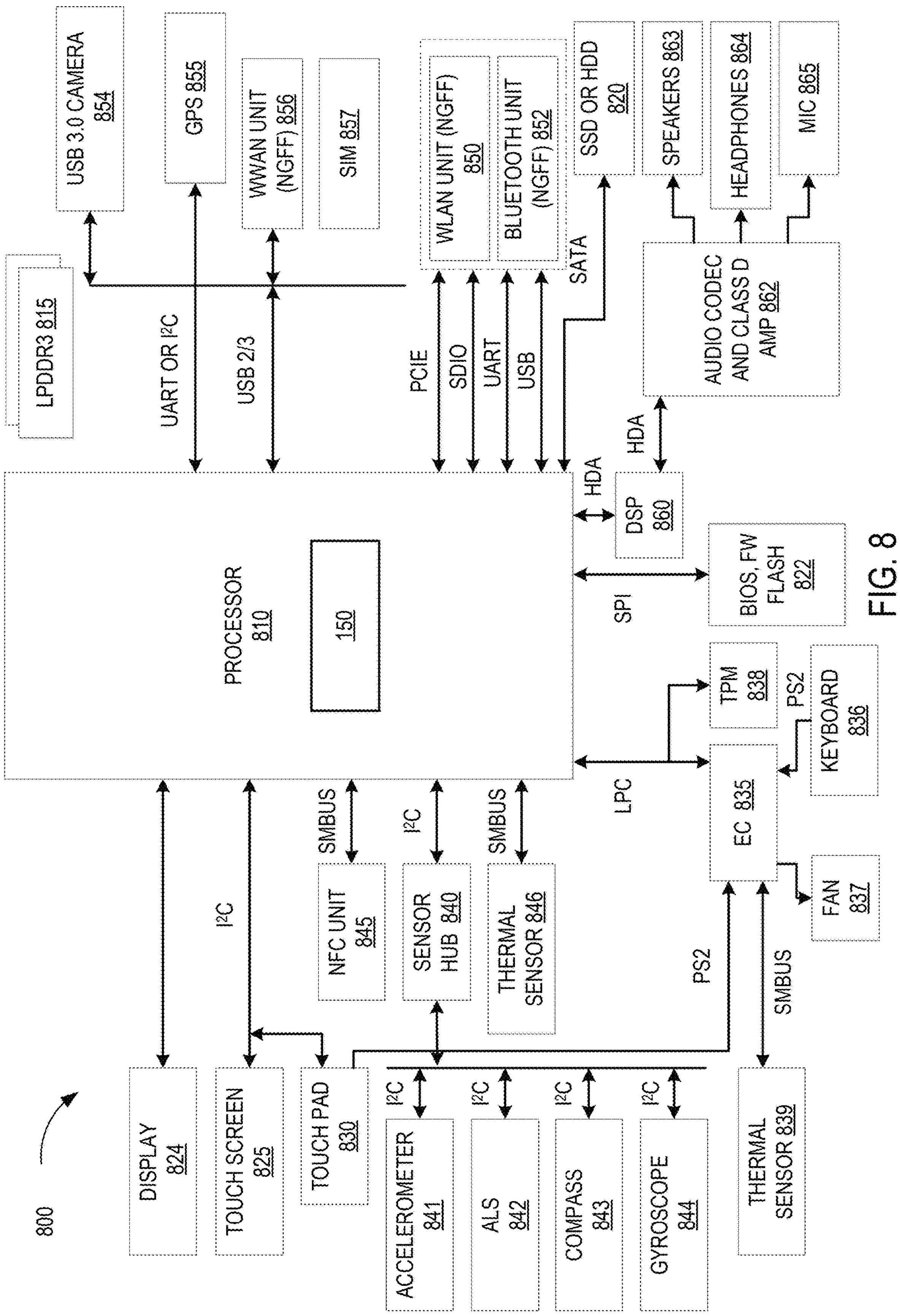
FIG. 8 is a block diagram illustrating a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 800 may include, without limitation, processor 810 communicatively coupled to any suitable number or kind of components, peripherals, modules, or devices. In at least one embodiment, processor 810 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an example SoC. In at least one embodiment, devices illustrated in FIG. 8 may be interconnected with proprietary interconnects, standardized interconnects (e.g., PCIe) or some combination thereof.

In at least one embodiment, one or more components of FIG. 8 are interconnected using compute express link (CXL) interconnects.

In at least one embodiment, FIG. 6 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) unit 855, a camera ("USB 3.0 camera") 854 such as a USB 3.0 camera, and/or a Low Power Double Data Rate ("LPDDR") memory unit ("LPDDR3") 815 implemented in, for example, an LPDDR3 standard. These components may each be implemented in any suitable manner.

In at least one embodiment, other components may be communicatively coupled to processor 810 through components described herein. In at least one embodiment, an accelerometer 841, an ambient light sensor ("ALS") 842, a compass 843, and a gyroscope 844 may be communicatively coupled to sensor hub 840. In at least one embodiment, a thermal sensor 839, a fan 837, a keyboard 836, and touch pad 830 may be communicatively coupled to EC 835. In at least one embodiment, speakers 863, headphones 864, and a microphone ("mic") 865 may be communicatively coupled to an audio unit ("audio codec and class D amp") 862, which may in turn be communicatively coupled to DSP 860. In at least one embodiment, audio unit 862 may include, for example and without limitation, an audio coder/decoder ("codec") and a class D amplifier. In at least one embodiment, a SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the electronic device of FIG. 8 for performing image processing operations, including CCM calibration operations.

Figure 9:
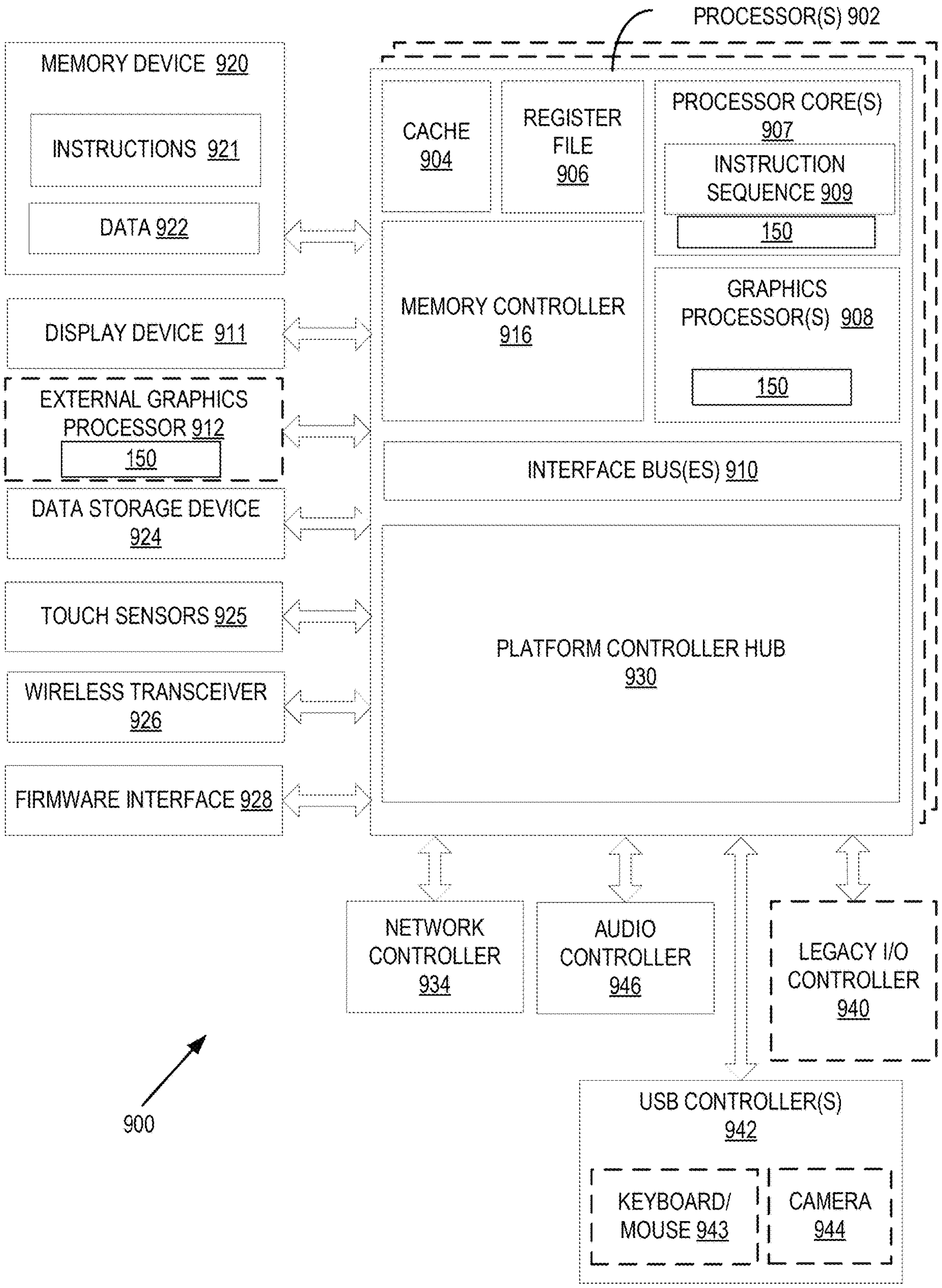
FIG. 9 illustrates at least portions of a graphics processor, according to at least one embodiment.

FIG. 9 is a block diagram of a processing system, according to at least one embodiment. In at least one embodiment, system 900 includes one or more processors 902 and one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, or embedded devices.

In at least one embodiment, system 900 can include, or be incorporated within a server-based gaming platform, a game console, including a game and media console, a mobile gaming console, a handheld game console, or an online game console. In at least one embodiment, system 900 is a mobile phone, a smart phone, a tablet computing device or a mobile Internet device. In at least one embodiment, processing system 900 can also include, couple with, or be integrated within a wearable device, such as a smart watch wearable device, a smart eyewear device, an augmented reality device, or a virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction sequence 909. In at least one embodiment, instruction sequence 909 may facilitate Complex Instruction Set Computing (CISC), Reduced Instruction Set Computing (RISC), or computing via a Very Long Instruction Word (VLIW). In at least one embodiment, processor cores 907 may each process a different instruction sequence 909, which may include instructions to facilitate emulation of other instruction sequences. In at least one embodiment, processor core 907 may also include other processing devices, such a Digital Signal Processor (DSP).

In at least one embodiment, processor 902 includes a cache memory 904. In at least one embodiment, processor 902 can have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, a register file 906 is additionally included in processor 902, which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910 can be a processor bus, such as a version of a Direct Media Interface (DMI) bus. In at least one embodiment, interface bus 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, a memory device 920 can be a dynamic random access memory (DRAM) device, a static random access memory (SRAM) device, flash memory device, phase-change memory device, or some other memory device having suitable performance to serve as process memory. In at least one embodiment, memory device 920 can operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 can connect to processor(s) 902. In at least one embodiment, display device 911 can include one or more of an internal display device, as in a mobile electronic device or a laptop device, or an external display device attached via a display interface (e.g., DisplayPort, etc.). In at least one embodiment, display device 911 can include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 can connect via a storage interface (e.g., SATA) or via a peripheral bus, such as a Peripheral Component Interconnect bus (e.g., PCI, PCI Express). In at least one embodiment, touch sensors 925 can include touch screen sensors, pressure sensors, or fingerprint sensors. In at least one embodiment, wireless transceiver 926 can be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and can be, for example, a unified extensible firmware interface (UEFI). In at least one embodiment, network controller 934 can enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system 900. In at least one embodiment, platform controller hub 930 can also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 can include an external memory controller 916 and platform controller hub 930, which may be configured as a memory controller hub and peripheral controller hub within a system chipset that is in communication with processor(s) 902.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 122 and/or processing logic 150 may be used in the system of FIG. 9 for performing image processing operations, including CCM calibration operations.

Figure 10:
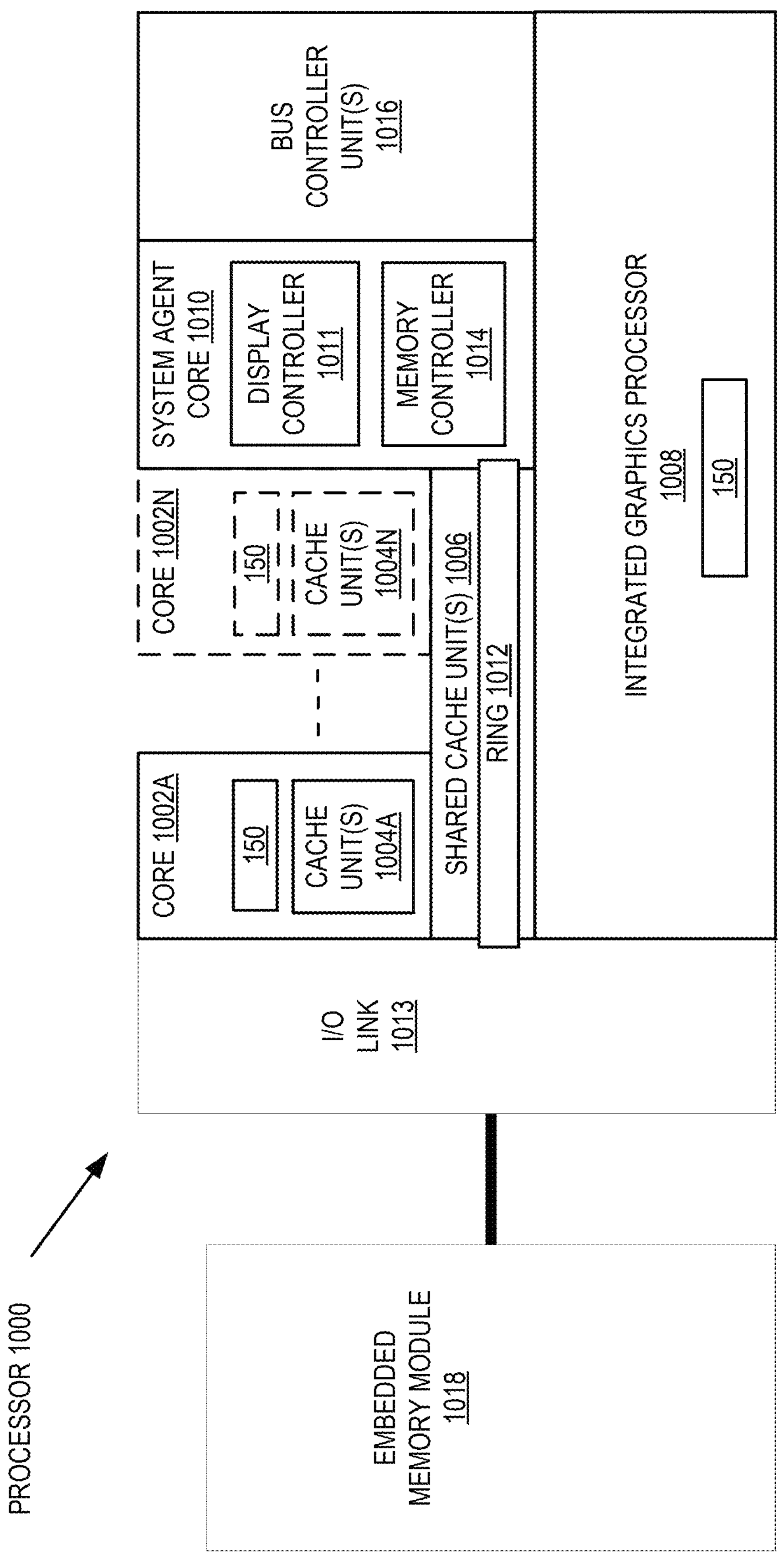
FIG. 10 illustrates at least portions of a graphics processor, according to at least one embodiment.

FIG. 10 is a block diagram of a processor 1000 having one or more processor cores 1002A-1002N, an integrated memory controller 1014, and an integrated graphics processor 1008, according to at least one embodiment. In at least one embodiment, processor 1000 can include additional cores up to and including additional core 1002N represented by dashed lined boxes. In at least one embodiment, each of processor cores 1002A-1002N includes one or more internal cache units 1004A-1004N. In at least one embodiment, each processor core also has access to one or more shared cached units 1006.

In at least one embodiment, internal cache units 1004A-1004N and shared cache units 1006 represent a cache memory hierarchy within processor 1000. In at least one embodiment, cache memory units 1004A-1004N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1006 and 1004A-1004N.

In at least one embodiment, processor 1000 may also include a set of one or more bus controller units 1016 and a system agent core 1010. In at least one embodiment, bus controller units 1016 manage a set of peripheral buses, such as one or more PCI or PCI express busses. In at least one embodiment, system agent core 1010 provides management functionality for various processor components. In at least one embodiment, system agent core 1010 includes one or more integrated memory controllers 1014 to manage access to various external memory devices (not shown).

In at least one embodiment, one or more of processor cores 1002A-1002N include support for simultaneous multi-threading. In at least one embodiment, system agent core 1010 includes components for coordinating and operating cores 1002A-1002N during multi-threaded processing. In at least one embodiment, system agent core 1010 may additionally include a power control unit (PCU), which includes logic and components to regulate one or more power states of processor cores 1002A-1002N and graphics processor 1008.

In at least one embodiment, processor 1000 additionally includes graphics processor 1008 to execute graphics processing operations. In at least one embodiment, graphics processor 1008 couples with shared cache units 1006, and system agent core 1010, including one or more integrated memory controllers 1014. In at least one embodiment, system agent core 1010 also includes a display controller 1011 to drive graphics processor output to one or more coupled displays. In at least one embodiment, display controller 1011 may also be a separate module coupled with graphics processor 1008 via at least one interconnect, or may be integrated within graphics processor 1008.

In at least one embodiment, a ring-based interconnect unit 1012 is used to couple internal components of processor 1000. In at least one embodiment, an alternative interconnect unit may be used, such as a point-to-point interconnect, a switched interconnect, or other techniques. In at least one embodiment, graphics processor 1008 couples with ring interconnect 1012 via an I/O link 2113.

In at least one embodiment, I/O link 1013 represents at least one of multiple varieties of I/O interconnects, including an on package I/O interconnect which facilitates communication between various processor components and a high-performance embedded memory module 1018, such as an eDRAM module. In at least one embodiment, each of processor cores 1002A-1002N and graphics processor 1008 use embedded memory module 1018 as a shared Last Level Cache.

In at least one embodiment, processor cores 1002A-1002N are homogeneous cores executing a common instruction set architecture. In at least one embodiment, processor cores 1002A-1002N are heterogeneous in terms of instruction set architecture (ISA), where one or more of processor cores 1002A-1002N execute a common instruction set, while one or more other cores of processor cores 1002A-1002N executes a subset of a common instruction set or a different instruction set. In at least one embodiment, processor cores 1002A-1002N are heterogeneous in terms of microarchitecture, where one or more cores having a relatively higher power consumption couple with one or more power cores having a lower power consumption. In at least one embodiment, processor 1000 can be implemented on one or more chips or as an SoC integrated circuit.

Processing logic 122 and/or processing logic 150 may be used to perform image processing operations, including CCM calibration operations, associated with one or more embodiments. Details regarding processing logic 122 and processing logic 150 are provided herein in conjunction with FIG. 1. In at least one embodiment, processing logic 150 may be incorporated into graphics processor 1008. For example, in at least one embodiment, image processing and/or CCM calibration techniques described herein may use one or more of ALUs embodied in a 3D pipeline, graphics core(s) 1002, shared function logic, or other logic in FIG. 10. Moreover, in at least one embodiment, image processing and/or CCM calibration operations described herein may be done using logic other than logic illustrated in FIG. 1. In at least one embodiment, parameters may be stored in on-chip or off-chip memory and/or registers (shown or not shown) that configure ALUs of processor 1000 to perform one or more image processing and/or CCM calibration techniques described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

receiving, using a processing device associated with an image signal processing (ISP) pipeline, a target image captured using a high dynamic range (HDR) sensor at a first bit-depth associated with the HDR sensor, the ISP pipeline being associated with a second bit-depth;

applying one or more dynamic range compression operations to brightness values associated with the target image to obtain compressed brightness values;

determining brightness gain values using the brightness values and the compressed brightness values;

applying the brightness gain values to individual color channels of respective pixels of the target image to obtain a compressed target image that preserves a color ratio of the compressed target image; and adjusting a color correction matrix (CCM) associated with the ISP pipeline using the compressed target image as a calibration reference, including analyzing differences between color values of the compressed target image and corresponding known color values, and determining CCM coefficients based on the differences.

2. The method of claim 1, further comprising:

receiving, using the processing device, a subsequent image captured at the first bit-depth using the HDR sensor;

applying the one or more dynamic range compression operations to the subsequent image to obtain a compressed subsequent image at the second bit-depth; and performing color correction on the compressed subsequent image using the adjusted CCM.

3. The method of claim 2, wherein the adjusted CCM transforms a color space of the compressed subsequent image from a nonlinear color space associated with the high dynamic range sensor to a linear color space.

4. The method of claim 1, wherein the second bit-depth is lower than the first bit-depth.

5. The method of claim 1, wherein the brightness gain values are scaling factors between the brightness values and the compressed brightness values.

6. The method of claim 1, wherein the one or more dynamic range compression operations are based on a compression curve associated with the ISP pipeline.

7. The method of claim 1, wherein the adjusting the CCM associated with the ISP pipeline using the compressed target image comprises:
converting the compressed target image from a color space associated with the HDR sensor to a perceptually uniform color space;
analyzing color differences between known color values associated with the target image and color values associated with the compressed target image in the perceptually uniform color space; and
determining CCM coefficients based on the color differences.

8. The method of claim 1, wherein the target image is a color chart comprising a plurality of regions of known color values.

9. A system comprising a high dynamic range (HDR) sensor; and
a processing device coupled to the HDR sensor, the processing device being associated with an image signal processing (ISP) pipeline, and the processing device is to:
receive a target image captured using the HDR sensor at a first bit-depth associated with the high dynamic range sensor;
apply one or more dynamic range compression operations to brightness values associated with the target image to obtain compressed brightness values;
determine brightness gain values using the brightness values and the compressed brightness values;
apply the brightness gain values to each color channel of respective pixels of the target image to obtain a compressed target image such that a color ratio of the compressed target image is preserved, the compressed target image being associated with a second bit-depth of the ISP pipeline; and
adjust a color correction matrix (CCM) associated with the ISP pipeline using the compressed target image as a calibration reference, including analyzing differences between color values of the compressed target image and corresponding known color values, and determining CCM coefficients based on the differences.

10. The system of claim 9, wherein the processing device is further to:
receive a subsequent image captured at the first bit-depth from the HDR sensor;
apply the one or more dynamic range compression operations to the subsequent image to obtain a compressed subsequent image at the second bit-depth; and
perform color correction on the compressed subsequent image using the adjusted CCM.

11. The system of claim 10, wherein the adjusted CCM transforms a color space of the compressed subsequent image from a nonlinear color space associated with the HDR sensor to a linear color space.

12. The system of claim 9, wherein the second bit-depth is lower than the first bit-depth.

13. The system of claim 9, wherein the brightness gain values are scaling factors between the brightness values and the compressed brightness values.

14. The system of claim 9, wherein the one or more dynamic range compression operations are based on a compression curve associated with the ISP pipeline.

15. The system of claim 9, wherein to adjust a color correction matrix associated with the ISP pipeline using the compressed target image, the processing device is to:
convert the compressed target image from a color space associated with the HDR sensor to a perceptually uniform color space;
analyze color differences between known color values associated with the target image and color values associated with the compressed target image in the perceptually uniform color space; and
determine CCM coefficients based on the color differences.

16. The system of claim 9, wherein the target image is a color chart comprising a plurality of regions of known color values.

17. The system of claim 9, wherein the system is comprised of at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system for presenting at least one of augmented reality content, virtual reality content, or mixed reality content;
a system for hosting one or more real-time streaming applications;
a system implemented using an edge device;
a system implemented using a robot;
a system for performing one or more conversational AI operations;
a system implementing one or more language models;
a system implementing one or more large language models (LLMs);
a system for performing one or more generative AI operations;
a system for generating synthetic data;
a system incorporating one or more virtual machines (VMs);
a system implemented at least partially in a data center; or
a system implemented at least partially using cloud computing resources.

18. One or more processors associated with an image signal processing (ISP) pipeline comprising processing logic to:
receive a target image captured using a high dynamic range (HDR) sensor at a first bit-depth associated with the HDR sensor, wherein the ISP pipeline is associated with a second bit-depth;
apply one or more dynamic range compression operations to brightness values associated with the target image to obtain compressed brightness values;
determine brightness gain values using the brightness values and the compressed brightness values;
apply the brightness gain values to each color channel of respective pixels of the target image to obtain a compressed target image such that a color ratio of the compressed target image is preserved; and adjust a color correction matrix (CCM) associated with the ISP pipeline using the compressed target image as a calibration reference, including analyzing differences between color values of the compressed target image and corresponding known color values, and determining CCM coefficients based on the differences.

19. The one or more processors of claim 18, wherein the processing logic is further to:

receive a subsequent image captured at the first bit-depth using the HDR sensor;

apply the one or more dynamic range compression operations to the subsequent image to obtain a compressed subsequent image at the second bit-depth; and perform color correction on the compressed subsequent image using the adjusted CCM.

20. The one or more processors of claim 19, wherein the adjusted CCM transforms a color space of the compressed subsequent image from a nonlinear color space associated with the HDR sensor to a linear color space.

* * * * *